US010399233B2

(12) United States Patent
Tokushima

(10) Patent No.: US 10,399,233 B2
(45) Date of Patent: Sep. 3, 2019

(54) ROBOT

(71) Applicant: Seiko Epson Corporation, Tokyo (JP)

(72) Inventor: Daiki Tokushima, Azumino (JP)

(73) Assignee: Seiko Epson Corporation (JP)

( * ) Notice: Subject to any disclaimer, the term of this patent is extended or adjusted under 35 U.S.C. 154(b) by 31 days.

(21) Appl. No.: 15/873,197

(22) Filed: Jan. 17, 2018

(65) Prior Publication Data

US 2018/0207805 A1    Jul. 26, 2018

(30) Foreign Application Priority Data

Jan. 20, 2017  (JP) ................................. 2017-008763

(51) Int. Cl.
  *B25J 13/08*     (2006.01)
  *G01P 3/38*      (2006.01)

(52) U.S. Cl.
  CPC ............... *B25J 13/088* (2013.01); *G01P 3/38* (2013.01); *Y10S 901/02* (2013.01); *Y10S 901/47* (2013.01)

(58) Field of Classification Search
  CPC ......... B25J 13/088; G01P 3/38; Y10S 901/47; Y10S 901/02
  See application file for complete search history.

(56) References Cited

U.S. PATENT DOCUMENTS

| 2013/0011018 A1* | 1/2013 | Tateno ................. G01B 11/002 382/106 |
| 2015/0217451 A1* | 8/2015 | Harada .................. B25J 9/1612 700/253 |

FOREIGN PATENT DOCUMENTS

| JP | 63-187118 A | 8/1988 |
| JP | 08-247739 A | 9/1996 |

* cited by examiner

*Primary Examiner* — Phuoc Tran
(74) *Attorney, Agent, or Firm* — Harness, Dickey & Pierce, P.L.C.

(57) ABSTRACT

A robot includes: a base; a robot arm rotatably provided around a rotation axis relative to the base; a mark which rotates in accordance with rotation of the robot arm; a capturing element which captures the mark; a memory which stores a reference image therein; and a determination section which determines a rotation state of the robot arm by template matching by subpixel estimation using the reference image and an image captured by the capturing element, in which a relationship of $2R/B \leq L/X \leq 100R/B$ is satisfied when a viewing field size per one pixel of the capturing element is B, a distance between the rotation axis and the center of the mark is R, the maximum distance between the rotation axis and a tip of the robot arm is L, and repetition positioning accuracy of the tip of the robot arm is X.

20 Claims, 18 Drawing Sheets

ROBOT

BACKGROUND

1. Technical Field

The present invention relates to a robot.

2. Related Art

For example, in a robot including a robot arm having a rotatable joint portion, in general, a rotation state, such as a rotation angle, a rotation position, the number of rotations, and a rotation velocity, of the joint portion is detected by an encoder, and driving of the joint portion is controlled based on the detection result.

For example, the encoder described in JP-A-63-187118 reads a code plate on which a numerical value pattern, such as a gray code, and a stripe-like pattern, are formed by a capturing element, and detects a position from the read numerical value pattern and the stripe-like pattern.

In order to improve repetition positioning accuracy, such as repetition position accuracy of the robot arm, for example, in a case of using the encoder described in JP-A-63-187118, it is necessary to increase a magnification of an optical component provided between the pattern and the capturing element, and to decrease a pixel size of the capturing element. However, in the related art, when the repetition positioning accuracy of the robot arm is desired to be improved, expensive optical components and capturing elements having performance higher than necessary is used, and as a result, there is a problem that the costs of the encoder or the costs of the robot increase.

SUMMARY

An advantage of some aspects of the invention is to provide a robot which can satisfy required repetition positioning accuracy of a robot arm and can achieve low costs.

The advantage can be achieved by the following configurations.

A robot according to an aspect of the invention includes: a base; a robot arm provided to be rotatable around a rotation axis with respect to the base; a mark which rotates around the rotation axis in accordance with the rotation of the robot arm; a capturing element which captures the mark; a storage section which stores a reference image therein; and a determination section which determines a rotation state of the robot arm by template matching by a subpixel estimation method by using the reference image with respect to an image captured by the capturing element, in which a relationship of $2R/B \leq L/X \leq 100R/B$ is satisfied when a viewing field size per one pixel of the capturing element is B [m], a distance between the rotation axis and the center of the mark is R [m], the maximum distance between the rotation axis and a tip end portion of the robot arm is L [m], and repetition positioning accuracy of the tip end portion is X [m].

According to the robot, by optimizing the relationship of the viewing field size B, the maximum distance L, the distance R, and the repetition positioning accuracy X, it is possible to select the capturing element and the optical component having sufficient specification necessary for satisfying the required positioning accuracy (repetition positioning accuracy) of the robot arm, and as a result, it is possible to achieve low costs of the encoder or low costs of the robot. For example, since the magnification of the optical component provided between the mark and the capturing element may not be excessively large or the pixel size of the capturing element may not be excessively small, it is possible to use an optical component and the capturing element which are relatively inexpensive, and as a result, it is possible to achieve low costs of the encoder.

A robot according to another aspect of the invention includes: a robot arm including a first arm and a second arm provided to be rotatable around a rotation axis with respect to the first arm; a mark which rotates around the rotation axis in accordance with the rotation of the second arm; a capturing element which captures the mark; a storage section which stores a reference image therein; and a determination section which determines a rotation state of the second arm with respect to the first arm by template matching by a subpixel estimation method by using the reference image with respect to an image captured by the capturing element, in which a relationship of $2R/B \leq L/X \leq 100R/B$ is satisfied when a viewing field size per one pixel of the capturing element is B [m], a distance between the rotation axis and the center of the mark is R [m], the maximum distance between the rotation axis and a tip end portion of the robot arm is L [m], and repetition positioning accuracy of the tip end portion of the robot arm is X [m].

According to the robot, by optimizing the relationship of the viewing field size B, the maximum distance L, the distance R, and the repetition positioning accuracy X, it is possible to select the capturing element and the optical component having sufficient specification necessary for satisfying the required positioning accuracy (repetition positioning accuracy) of the robot arm, and as a result, it is possible to achieve low costs of the encoder or low costs of the robot.

In the robot according to the aspect of the invention, it is preferable that a member which supports the first arm to be rotatable around a first rotation axis; a first encoder which includes a first mark that rotates around the first rotation axis in accordance with rotation of the first arm with respect to the member, and a first capturing element that captures the first mark, and detects a rotation state of the first arm with respect to the member by using a signal output from the first capturing element; and a second encoder which includes a second mark which is the mark that rotates around a second rotation axis which is the rotation axis, and a second capturing element which is the capturing element, are provided, at least one of a case where the viewing field size per one pixel of the second capturing element is equal to the viewing field size per one pixel of the first capturing element and a case where the distance between the second rotation axis and the center of the second mark is equal to the distance between the first rotation axis and the center of the first mark, is satisfied, and resolving power per one rotation of each of the first encoder and the second encoder is equal to or greater than 14 bits.

With this configuration, it is possible to improve tracking accuracy of the robot. In addition, it is possible to achieve low costs of the encoders, and to reduce deterioration of a processing velocity.

In the robot according to the aspect of the invention, it is preferable that a plurality of the marks are provided, and the capturing element captures two entire marks adjacent to each other in a circumferential direction around the rotation axis.

With this configuration, even when it is not possible to accurately read one of the two marks captured by the capturing element due to contamination or the like, it is possible to read and detect the other mark.

In the robot according to the aspect of the invention, it is preferable that the determination section sets a search region in a region of a part of the captured image, and performs the template matching in the search region.

With this configuration, it is possible to reduce the number of pixels of the search region used in the template matching, and to reduce computing time related to the template matching. Therefore, it is possible to perform high-accuracy detection even in a case where the angular velocity of the mark is high. In addition, even when distortion or blur of an outer circumferential part of the captured image of the capturing element becomes large due to aberration of a lens disposed between the capturing element and the mark, by using the region in which the distortion or blur is small as the search region, it is possible to reduce deterioration of the detection accuracy.

In the robot according to the aspect of the invention, it is preferable that the determination section is capable of changing at least one of a position and a length in a first direction of the search region in the captured image based on an angular velocity around the rotation axis in the determination result of the past rotation state of the mark.

With this configuration, it is possible to set the efficient search region which corresponds to the rotation state (angular velocity) of the mark, and to further reduce the number of pixels of the search region used in the template matching.

In the robot according to the aspect of the invention, it is preferable that the determination section calculates the angular velocity based on the determination result of the two or more past rotation states.

With this configuration, it is possible to relatively simply set the search region which corresponds to the rotation state (angular velocity) of the mark.

In the robot according to the aspect of the invention, it is preferable that the determination section is capable of changing at least one of the position and the length in the first direction of the search region in the captured image based on angular acceleration around the rotation axis in the determination result of the past rotation state of the mark.

With this configuration, it is possible to set more efficient search region which corresponds to the change (angular acceleration) in rotation state (angular velocity) of the mark.

In the robot according to the aspect of the invention, it is preferable that the determination section calculates the angular acceleration based on the determination result of the three or more past rotation states.

With this configuration, it is possible to relatively simply set the search region which corresponds to the change (angular acceleration) of the rotation state (angular velocity) of the mark.

In the robot according to the aspect of the invention, it is preferable that the determination section is capable of changing at least one of a position and a length in a second direction perpendicular to the first direction of the search region in the captured image based on the position in the first direction of the search region in the captured image.

With this configuration, it is possible to set the efficient search region which corresponds to the rotation state (rotation angle) of the mark, and to further reduce the number of pixels of the search region used in the template matching.

In the robot according to the aspect of the invention, it is preferable that the determination section is capable of changing a posture of the reference image based on the rotation angle around the rotation axis in the determination result of the past rotation state of the mark.

With this configuration, even in a case where the change in posture of the image of the mark in the search region is large, it is possible to reduce a computing amount of the template matching, and to improve the accuracy of the template matching.

In the robot according to the aspect of the invention, it is preferable that the determination section determines whether or not the rotation angle around the rotation axis of the mark is greater than a set angle, and changes the posture of the reference image based on the determination result.

With this configuration, it is possible to achieve high accuracy of the template matching, and to further reduce the computing amount of the template matching.

In the robot according to the aspect of the invention, it is preferable that an inertial sensor provided in the robot arm is further provided.

With this configuration, by controlling an operation of the robot arm based on the detection result (angular velocity, acceleration or the like) of the inertial sensor, it is possible to reduce vibration of the robot arm. Therefore, it is possible to perform the positioning of the tip end portion of the robot arm with high accuracy and at a high velocity.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot according to the invention will be described in detail based on appropriate embodiments illustrated in the attached drawings.

First Embodiment

Robot

Figure 1:
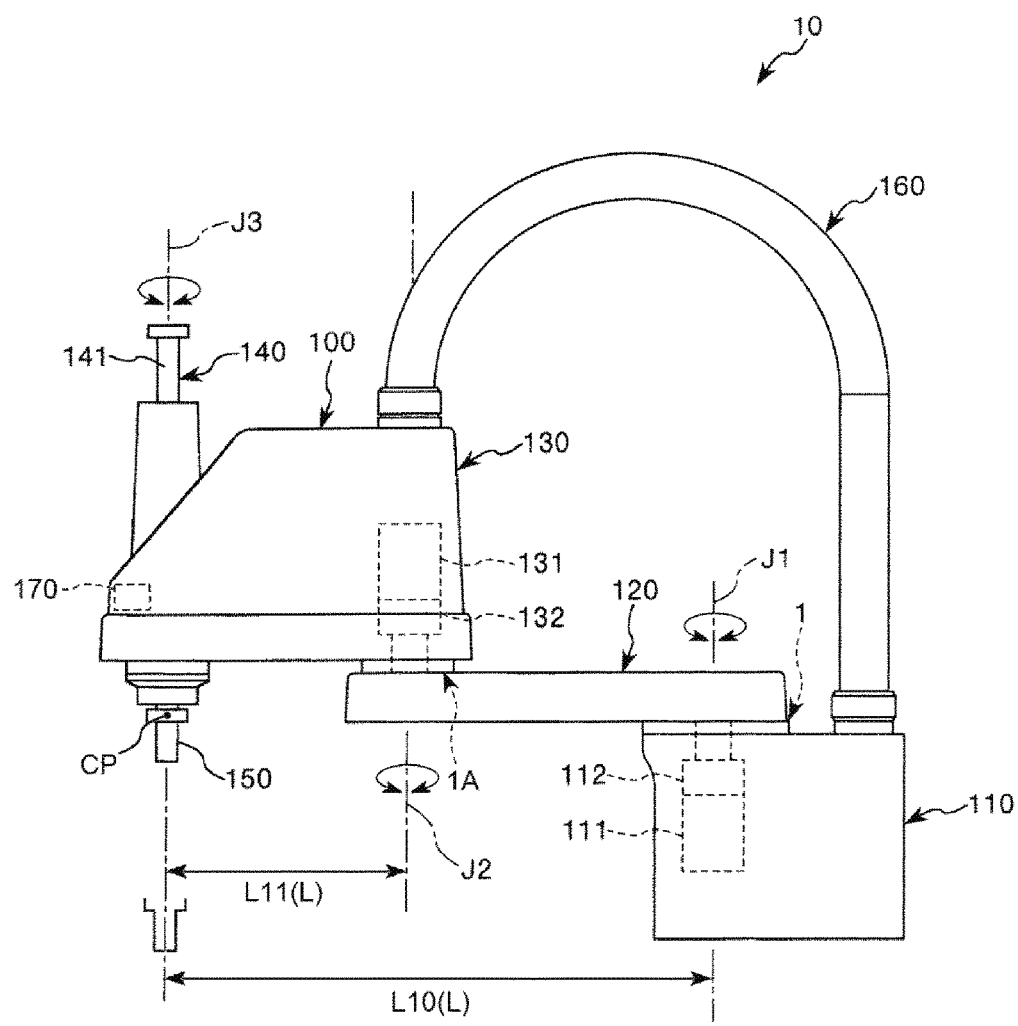
FIG. 1 is a side view illustrating a robot according to a first embodiment of the invention.

FIG. 1 is a side view illustrating a robot according to an embodiment of the invention. In addition, hereinafter, for the convenience of the description, an upper side in FIG. 1 is referred to as "up", and a lower side is referred to as "down". In addition, a base side in FIG. 1 is referred to as "base end side", and a side opposite thereto (end effector side) is referred to as "tip end side". In addition, an upward-and-downward direction of FIG. 1 is referred to as "vertical direction", and a leftward-and-rightward direction is referred to as "horizontal direction".

A robot 10 illustrated in FIG. 1 is a so-called selective compliance assembly robot arm robot (SCARA robot), and for example, the robot 10 is used in a manufacturing process or the like for manufacturing precision equipment or the like, and can perform gripping or transporting of the precision equipment or components.

As illustrated in FIG. 1, the robot 10 includes a base 110, a first arm 120, a second arm 130, a work head 140, an end effector 150, a wiring drawing portion 160 and an inertial sensor 170. Here, the first arm 120, the second arm 130, and the work head 140 configure a robot arm 100. Hereinafter, each portion of the robot 10 will be briefly described in order.

The base 110 is, for example, fixed to a floor surface which is not illustrated by a bolt or the like. The first arm 120 is linked to an upper end portion of the base 110. The first arm 120 is rotatable around a first axis J1 along the vertical direction with respect to the base 110.

In the base 110, a first motor 111 which generates a driving force that rotates the first arm 120, and a first decelerator 112 which decelerates the driving force of the first motor 111, are installed. An input axis of a first decelerator 112 is linked to a rotation axis of the first motor 111, and an output axis of the first decelerator 112 is linked to the first arm 120. Therefore, when the first motor 111 is driven and the driving force is transmitted to the first arm 120 via the first decelerator 112, the first arm 120 rotates on a horizontal plane around the first axis J1 with respect to the base 110. In addition, in the base 110 and the first arm 120, an encoder 1 which is a first encoder that detects a rotation state of the first arm 120 with respect to the base 110 is provided.

The second arm 130 is linked to the tip end portion of the first arm 120. The second arm 130 is rotatable around a second axis J2 along the vertical direction with respect to the first arm 120. In the second arm 130, a second motor 131 which generates a driving force that rotates the second arm 130 and a second decelerator 132 which decelerates the driving force of the second motor 131, are installed. In addition, as the driving force of the second motor 131 is transmitted to the first arm 120 via the second decelerator 132, the second arm 130 rotates on the horizontal plane around the second axis J2 with respect to the first arm 120. In addition, in the first arm 120 and the second arm 130, an encoder 1A which is a second encoder that detects the rotation state of the second arm 130 with respect to the first arm 120 is provided.

In addition, in the second arm 130, the inertial sensor 170 is provided. The inertial sensor 170 is, for example, a vibration type angular velocity sensor (gyro sensor) including a vibration element configured by using silicon or a crystal. In the embodiment, the inertial sensor 170 has a function of detecting the angular velocity around at least one of the first axis J1 and the second axis J2 of the robot arm 100. The detection result of the inertial sensor 170 is input to a control device which is not illustrated, and is used in driving control of the robot arm 100. Accordingly, it is possible to reduce the vibration of the robot arm 100. In addition, the inertial sensor similar to the inertial sensor 170 is provided in the first arm 120, and the robot arm 100 may be driven and controlled by using the detection result of the inertial sensor.

In the tip end portion of the second arm 130, the work head 140 is disposed. The work head 140 has a splined shaft 141 which is inserted into a spline nut and a ball screw nut (which are not illustrated) that are coaxially disposed in the tip end portion of the second arm 130. The splined shaft 141 is rotatable around an axis thereof with respect to the second arm 130, and is movable (can be raised and lowered) in the upward-and-downward direction.

Although not illustrated, in the second arm 130, a rotation motor and a raising and lowering motor are disposed. When the driving force of the rotation motor is transmitted to the spline nut by a driving force transmission mechanism which is not illustrated, and the spline nut normally and reversely rotates, the splined shaft 141 normally and reversely rotates around an axis J3 along the vertical direction. In addition, although not illustrated, in the rotation motor, a third encoder which detects the rotation state of the splined shaft 141 with respect to the second arm 130, is provided.

Meanwhile, when the driving force of the raising and lowering motor is transmitted to the ball screw nut by the driving force transmission mechanism which is not illustrated, and the ball screw nut normally and reversely rotates, the splined shaft 141 moves upward and downward. In the raising and lowering motor, a fourth encoder which detects a movement amount of the splined shaft 141 with respect to the second arm 130 is provided.

The end effector 150 is linked to the tip end portion (lower end portion) of the splined shaft 141. The end effector 150 is not particularly limited, and for example, a member which grips a transported object and a member which processes a processed object, is employed as the end effector 150.

A plurality of wirings which are connected to each of electronic components (for example, the second motor, the rotation motor, the raising and lowering motor, and the first to fourth encoders) disposed in the second arm 130 are drawn to the inside of the base 110 through the inside of the tube-like wiring drawing portion 160 that links the second arm 130 and the base 110 to each other. Furthermore, the plurality of wirings are put together in the base 110, are installed on the outside of the base 110 together with the wiring connected to the first motor 111 and the encoder 1, and are drawn to the control device which is not illustrated and integrally controls the robot 10.

Above, a configuration of the robot 10 is briefly described. As described above, the robot 10 includes the encoder 1 (first encoder) which detects the rotation state of the first arm 120 with respect to the base 110, and the encoder 1A (second encoder) which detects the rotation state of the second arm 130 with respect to the first arm 120. Hereinafter, the encoders 1 and 1A will be described in detail.

Encoder

First Encoder

Figure 2:
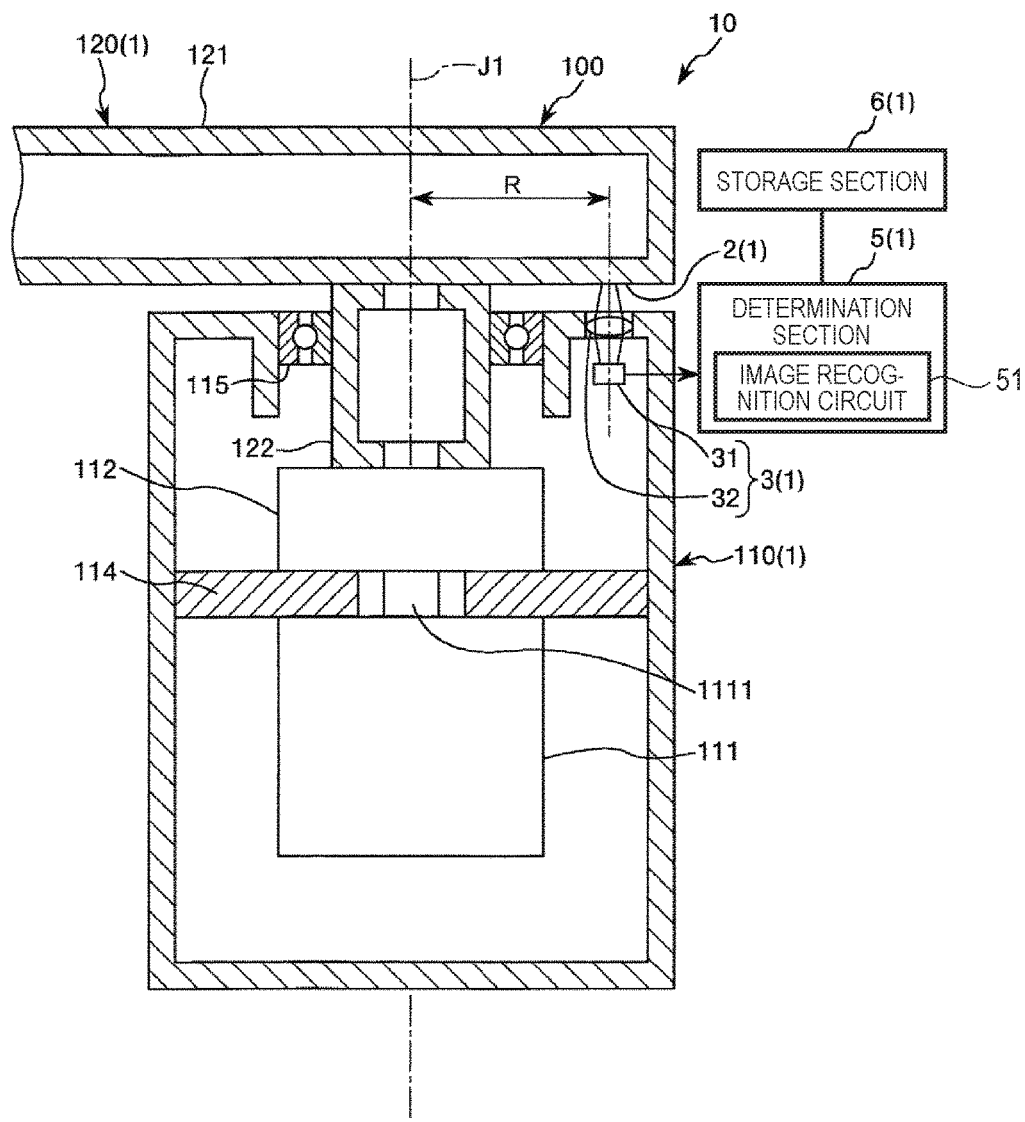
FIG. 2 is a sectional view for illustrating an encoder (first encoder) included in the robot illustrated in FIG. 1.
Figure 3:
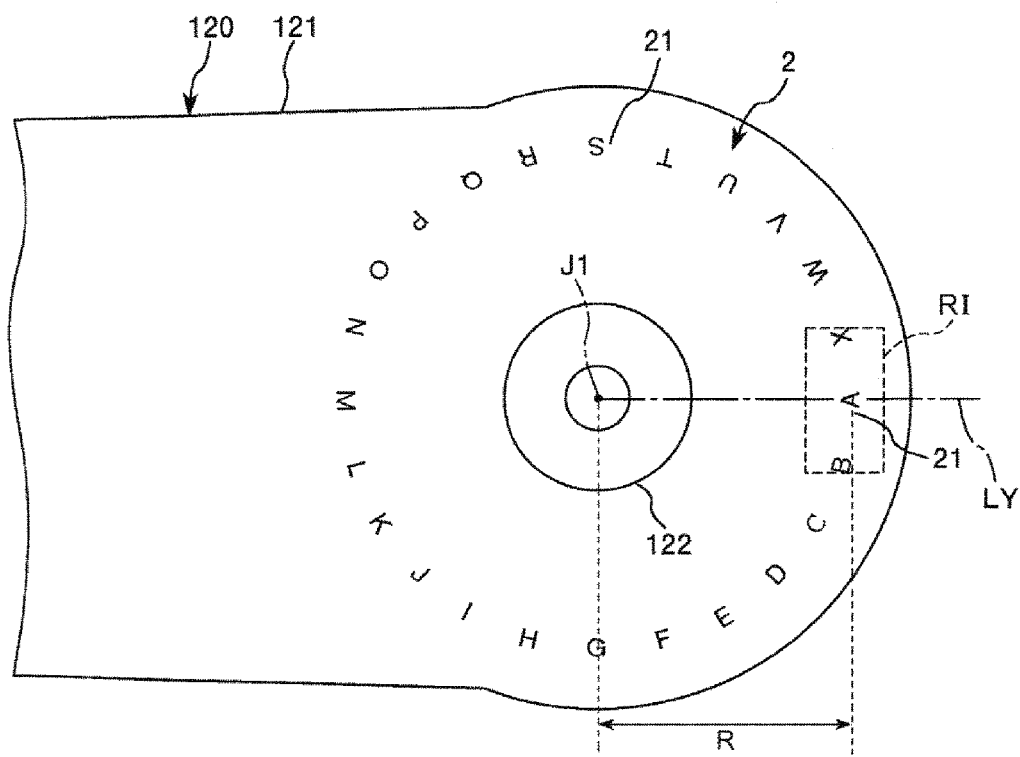
FIG. 3 is a view for illustrating a mark included in the encoder illustrated in FIG. 2.

FIG. 2 is a sectional view for illustrating the encoder (first encoder) included in the robot illustrated in FIG. 1. FIG. 3 is a view for illustrating a mark included in the encoder illustrated in FIG. 2.

As illustrated in FIG. 2, the base 110 of the above-described robot 10 includes a support member 114 which supports the first motor 111 and the first decelerator 112, and accommodates the first motor 111 and the first decelerator 112 therein. In the base 110, the first arm 120 is provided to be rotatable around the first axis J1.

Here, the first arm 120 includes an arm main body portion 121 which extends along the horizontal direction, and an axis portion 122 which protrudes downward from the arm main body portion 121, and the arm main body portion 121 and the axis portion 122 are connected to each other. In addition, the axis portion 122 is supported to be rotatable around the first axis J1 in the base 110 via a bearing 115, and is connected to the output axis of the first decelerator 112. In addition, the input axis of the first decelerator 112 is connected to a rotation axis 1111 of the first motor 111.

In the base 110 and the first arm 120 which relatively rotate, the encoder 1 which detects the rotation state thereof is provided.

The encoder 1 includes a mark portion 2 provided in the first arm 120, a mark detection portion 3 which is provided in the base 110 and detects the mark portion 2, a determination section 5 which determines a relative rotation state of the base 110 and the first arm 120 based on the detection result of the mark detection portion 3, and a storage section 6 which is electrically connected to the determination section 5.

The mark portion 2 is provided at apart which opposes the base 110 of the arm main body portion 121, that is, at a part which surrounds the axis portion 122 on a lower surface of the arm main body portion 121. As illustrated in FIG. 3, the mark portion 2 includes a plurality of marks 21 disposed along the first axis J1 at a position different from the first axis J1. Here, the mark 21 is provided on the surface of the first arm 120. Accordingly, it is not necessary to provide a member for providing the mark 21 separately from the base 110 and the first arm 120. Therefore, it is possible to reduce the number of components.

In addition, the mark 21 is not limited in a case of being directly provided on the surface of the first arm 120, and for example, may be provided in a sheet-like member that adheres to the surface of the first arm 120, and may be provided in a plate-like member provided to rotate together with the first arm 120. In other words, the member provided with the mark 21 may be a member which rotates around the first axis J1 with respect to the base 110 together with the first arm 120.

In the embodiment, as illustrated in FIG. 3, the plurality of marks 21 is a plurality of position recognition marks which are different from each other and are disposed to be aligned at an equal interval (equal distance and an equal angular interval from the first axis J1) along the circumferential direction on a concentric circle around the first axis J1. The plurality of marks 21 illustrated in FIG. 3 are alphabets (Roman characters) different from each other, and in the drawing, 24 characters from A to X are disposed to be aligned at an equal interval in the circumferential direction in alphabetic order. Examples of a forming method of each of the marks 21 include laser marking, printing, cutting, and etching.

In addition, the number and the size of the marks 21 are determined in accordance with necessary resolving power and resolution or the like of a capturing element 31 which will be described later, are not limited to the example of the drawing, and are arbitrary. In addition, the interval in the circumferential direction between the plurality of marks 21 may be an equal interval. In addition, each of the marks 21 is not limited to the Roman characters illustrated in the drawing, may be numbers, may be other letters, such as Arabic alphabets or Chinese characters, or may use symbols other letters, codes, signs, emblems, patterns, or letters. In addition, each of the marks 21 may be recognizable by the determination section 5, and it is not necessary to be identified by a human. For example, instead of each of the marks 21, a one-dimensional barcode or a QR code (registered trademark) may be used.

The mark detection portion 3 illustrated in FIG. 2 includes the capturing element 31 provided in the base 110, and a lens 32 provided in an opening included in the base 110, and the capturing element 31 captures the marks 21 which are a part (a capturing region RI illustrated in FIG. 3) in the circumferential direction of the mark portion 2 via the lens 32. In addition, as necessary, a light source which illuminates the capturing region RI of the capturing element 31 may be provided.

Examples of the capturing element 31 include a charge coupled devices (CCD) and a complementary metal oxide semiconductor (CMOS). The capturing element 31 converts a captured image into an electric signal for each pixel, and outputs the electric signal. The capturing element 31 can be employed in any of two-dimensional capturing element (area image sensor) or a one-dimensional capturing element (line image sensor). It is desirable that the one-dimensional capturing element is disposed in a direction in which alignment of pixels is in contact with a clearance circle of the arm. In a case of using the two-dimensional capturing element, it is possible to obtain two-dimensional image having a large information amount, and it is easy to improve detection accuracy of the mark 21 by the template matching which will be described later. As a result, it is possible to detect the rotation state of the first arm 120 with high accuracy. In a case of using the one-dimensional capturing element, since an image obtaining period which is a so-called frame rate is high, it is possible to increase detection frequency, and it is advantageous during a high-speed operation.

The lens 32 is a magnification optical system. Accordingly, it is possible to improve the resolving power in the capturing region (capturing region RI illustrated in FIG. 3) of the capturing element 31. Here, as illustrated in FIG. 3, the capturing region RI of the capturing element 31 is set to partially overlap the lower surface of the first arm 120 in the circumferential direction of the mark portion 2. Accordingly, the capturing element 31 can capture the mark 21 which is in the capturing region RI. Therefore, by reading the mark 21 positioned in the capturing region RI, it is possible to know the rotation state of the first arm 120.

The determination section 5 illustrated in FIG. 2 determines the relative rotation state of the base 110 and the first arm 120 based on the detection result of the mark detection portion 3. Examples of the rotation state include a rotation angle, a rotation velocity, and rotation direction.

In particular, the determination section 5 includes an image recognition circuit 51 which image-recognizes the mark 21 by the template matching by using a reference image (reference image data) with respect to the captured image (captured image data) of the capturing element 31, and determines the relative rotation state of the base 110 and the first arm 120 by using the recognition result of the image recognition circuit 51. Here, the determination section 5 is configured to be capable of more specifically determining the relative rotation angle (hereinafter, also simply referred to as "rotation angle of the first arm 120") of the base 110 and the first arm 120 based on the position of the image of the mark 21 in the captured image of the capturing element 31. In addition, the determination section 5 is also configured to be capable of acquiring the rotation velocity based on the time interval during which the mark 21 is detected or determining the rotation direction based on an order of the type of the detected mark 21. In addition, the determination section 5 outputs a signal which corresponds to the above-described determination result, that is, a signal which corresponds to the rotation state of the base 110 and the first arm 120. The signal is input to the control device, such as a computer which is not illustrated, and is used in control of the operation of the robot 10. In addition, at least a part of the above-described determination section 5 may be embedded as hardware or software in the control device.

In addition, the determination section 5 also has a function of generating the reference image (template) obtained by cutting out a part (a part including the image of the mark 21) of the captured image of the capturing element 31. The generation of the reference image is performed for each of the marks 21 before determining the relative rotation state of the base 110 and the first arm 120 or at appropriate time as necessary. In addition, the generated reference image is stored in the storage section 6 in accordance with each of the marks 21. In addition, the determination section 5 performs the template matching by using the reference image (template) stored in the storage section 6. In addition, the template matching and the determination of the rotation state which uses the template matching will be described in detail later.

Here, in the storage section 6, corresponding to each of the marks 21, the above-described reference image (reference image data) is stored together with the information (identification information) related to the type of the mark 21 corresponding thereto, the information related to coordinates (coordinates of the reference pixel which will be described later) in the captured image, and the information (angle information) related to the rotation angle of the first arm 120. As the storage section 6, any of a nonvolatile memory and a volatile memory can be used, but it is possible to hold a state where the information is stored even when the power is not supplied, and it is preferable to use the non-volatile memory from the viewpoint that it is possible to achieve energy saving.

Second Encoder

Figure 4:
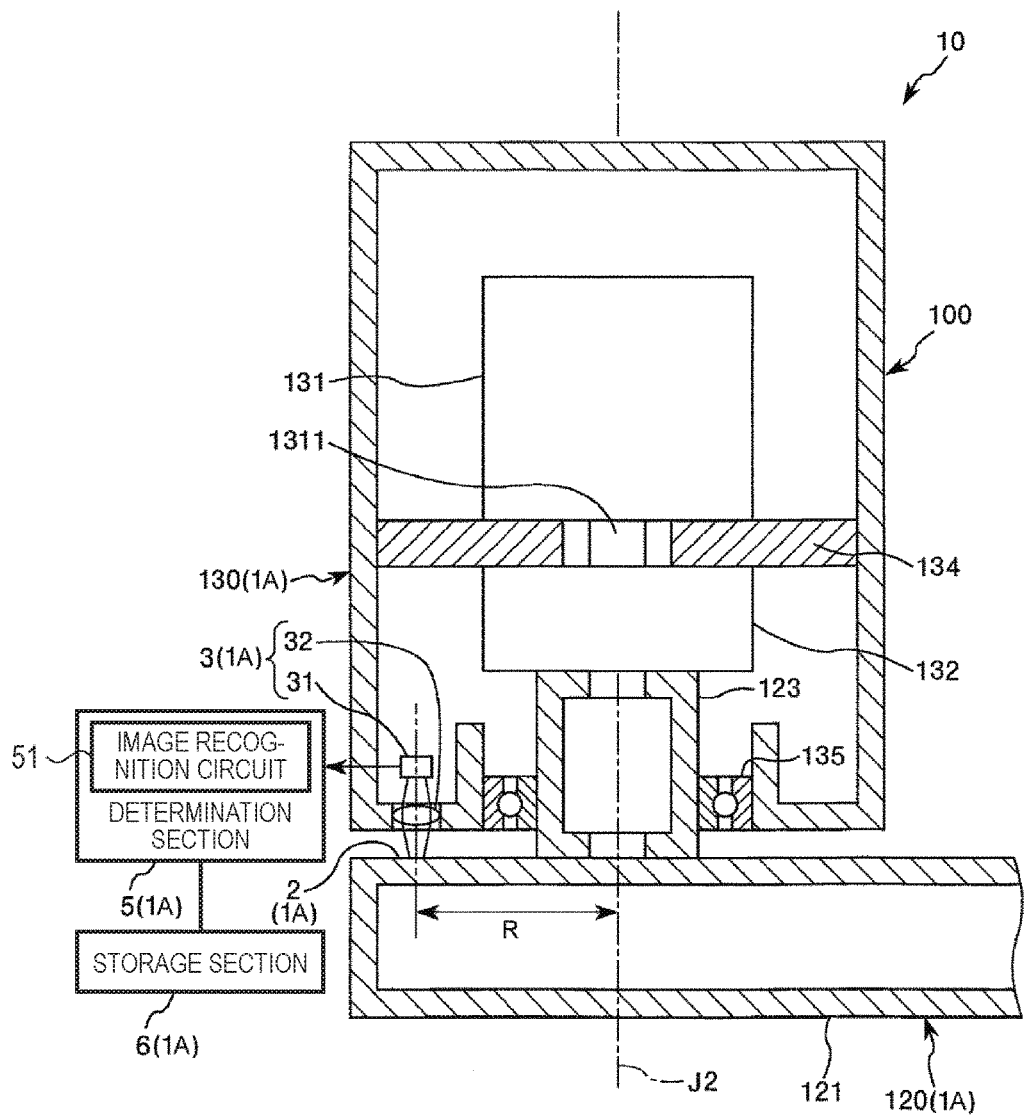
FIG. 4 is a sectional view for illustrating the encoder (second encoder) included in the robot illustrated in FIG. 1.

FIG. 4 is a sectional view for illustrating the encoder (second encoder) included in the robot illustrated in FIG. 1.

As illustrated in FIG. 4, the second arm 130 of the above-described robot 10 includes a support member 134 which supports the second motor 131 and the second decelerator 132, and accommodates the second motor 131 and the second decelerator 132 therein. The second arm 130 is provided to be rotatable around the second axis J2 with respect to the first arm 120.

Here, the first arm 120 includes an axis portion 123 which protrudes upward from the position in a longitudinal direction different from the above-described axis portion 122 of the arm main body portion 121 that extends along the horizontal direction, in addition to the above-described arm main body portion 121 and the axis portion 122. In addition, the axis portion 123 supports the second arm 130 to be rotatable around the second axis J2 via a bearing 135, and is connected to the output axis of the second decelerator 132. In addition, the input axis of the second decelerator 132 is connected to a rotation axis 1311 of the second motor 131.

In the first arm 120 and the second arm 130 which relatively rotate, the encoder 1A which detects the rotation state thereof is provided.

The encoder 1A has a configuration similar to the above-described encoder 1. In other words, the encoder 1A includes the mark portion 2 provided in the first arm 120, the mark detection portion 3 which is provided in the second arm 130 and detects the mark portion 2, the determination section 5 which determines the relative rotation state of the first arm 120 and the second arm 130 based on the detection result of the mark detection portion 3, and the storage section 6 which is electrically connected to the determination section 5.

Above, the robot 10 includes the base 110, the robot arm 100 provided to be rotatable around the first axis J1 (rotation axis) with respect to the base 110, and the encoder 1 which detects the rotation state around the first axis J1 of the robot arm 100 with respect to the base 110. Here, the encoder 1 includes the mark 21 which rotates in accordance with the rotation around the first axis J1 of the robot arm 100 with respect to the base 110, and the capturing element 31 which captures the mark 21, and detects the rotation state around the first axis J1 of the robot arm 100 with respect to the base 110 by using the signal output from the capturing element 31.

In particular, in the robot 10, a relationship of $2R/B \leq L/X \leq 100R/B$ is satisfied when a viewing field size per one pixel of the capturing element 31 of the encoder 1 is B [m], a distance between the first axis J1 (rotation axis) and the center of the mark 21 of the encoder 1 is R [m], the maximum distance L10 between the first axis J1 and a tip end portion CP of the robot arm 100 is L [m], and repetition positioning accuracy of the tip end portion CP of the robot arm 100 is X [m].

In this manner, by optimizing the relationship of the viewing field size B, the maximum distance L (L10), the distance R, and the repetition positioning accuracy X, it is possible to select the capturing element 31 and the lens 32 (optical component) having sufficient specification (performance or characteristics) necessary for satisfying the required positioning accuracy (repetition positioning accuracy) of the robot arm 100, and as a result, it is possible to achieve low costs of the encoder 1 or low costs of the robot 10. For example, since the magnification of the lens 32 provided between the mark 21 and the capturing element 31 may not be excessively large or the pixel size of the capturing element 31 may not be excessively small, it is possible to use relatively inexpensive lens 32 and the capturing element 31, and as a result, it is possible to achieve low costs of the encoder 1.

In particular, since the encoder 1 detects the rotation state of the rotation part on the most base 110 side of the robot arm 100, the requirement related to the detection accuracy is higher than that of the encoder 1A. therefore, regarding the encoder 1, when the relationship is satisfied, it can be said that the above-described effect is large.

In addition, "repetition positioning accuracy X" is "position overshoot amount" or "path repetition accuracy" which is measured based on JIS B 8432, and is written as "repetition accuracy" or "position repetition accuracy" in a product catalogue of the robot. In addition, "maximum distance L10 between the first axis J1 and the tip end portion CP of the robot arm 100" is the distance (inter-axis distance between the first axis J1 and the axis J3) between the first axis J1 and the tip end portion CP in a state where the tip end portion CP of the robot arm 100 becomes the farthest from the first axis J1 when viewed from the direction along the first axis J1 (rotation axis). In addition, the tip end portion CP of the robot arm 100 is any of the center (attachment center of the end effector 150) of a tip end surface of the splined shaft 141 and the center (TCP: toll center point) of the end effector 150.

Here, the encoder 1 includes the determination section 5, the determination section 5 detects the mark 21 by performing the template matching by using the reference image with respect to the captured image of the capturing element 31, and determines the rotation state of the first arm 120 with respect to the base 110 by using the detection result. Accordingly, even when the high-resolution mark 21 is not used, it is possible to determine the rotation state of the mark 21 with high accuracy based on the position of the image of the mark 21 in the captured image of the capturing element 31. In addition, even when the mark 21 is scratched due to contamination or the like, it is possible to detect the position of the image of the mark 21 in the captured image of the capturing element 31 by the template matching with high accuracy. Therefore, it is possible to achieve low costs, and to improve the detection accuracy.

In particular, it is preferable that the template matching in the determination section 5 uses a subpixel estimation method. Accordingly, it is possible to use the lens 32 and the capturing element 31 which have excellent repetition positioning accuracy X and are relatively inexpensive. Hereinafter, this will be described.

Figure 5:
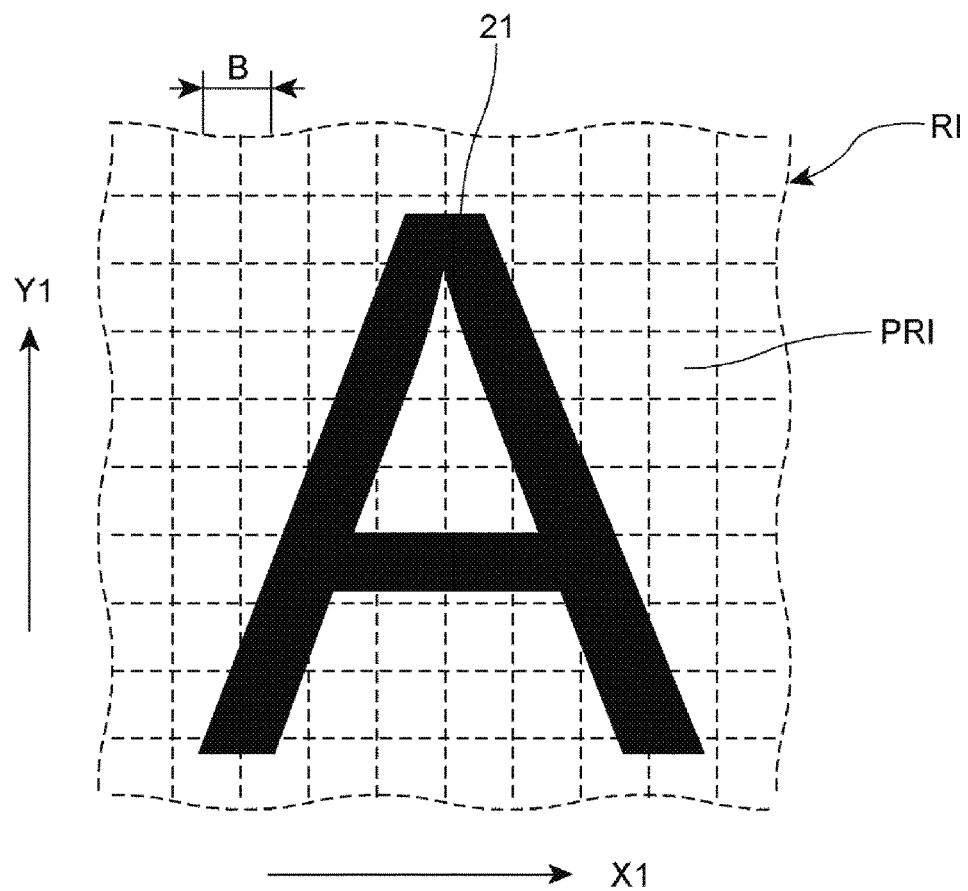
FIG. 5 is a view for illustrating a viewing field size per one pixel of a capturing element included in the encoder illustrated in FIG. 2.
Figure 6:
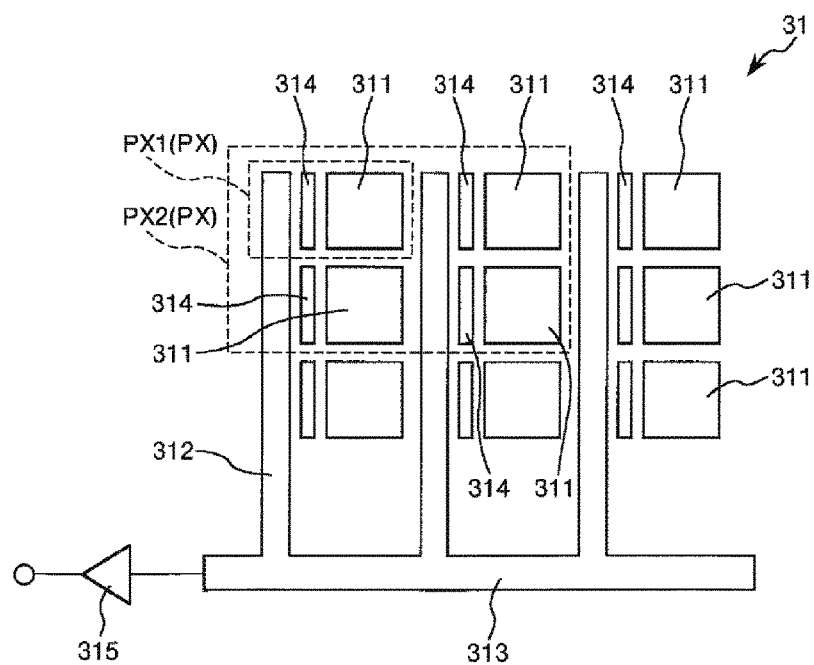
FIG. 6 is a view for illustrating the viewing field size per one pixel in a case where the capturing element is a CCD.
Figure 7:
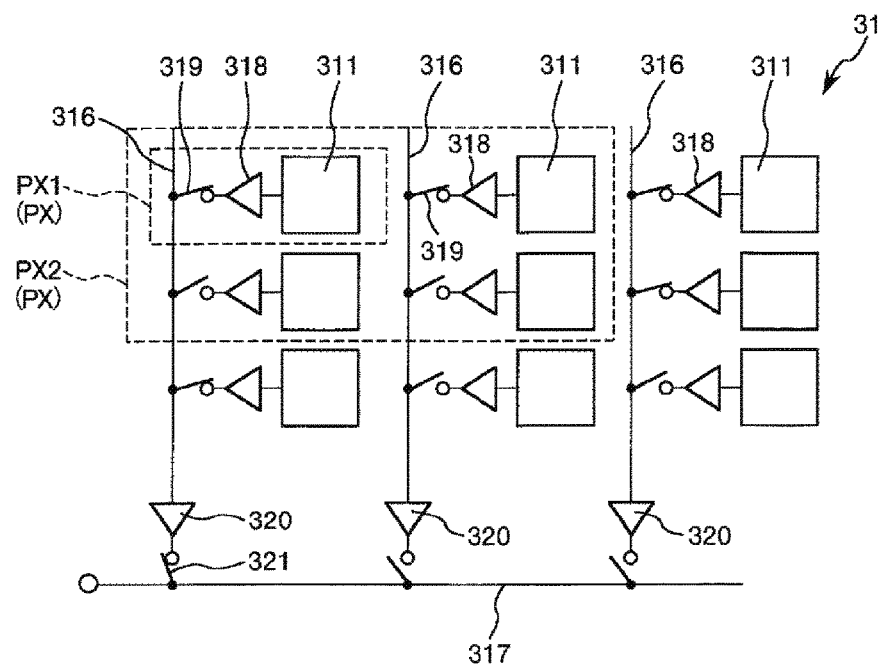
FIG. 7 is a view for illustrating the viewing field size per one pixel in a case where the capturing element is a CMOS.
Figure 8:
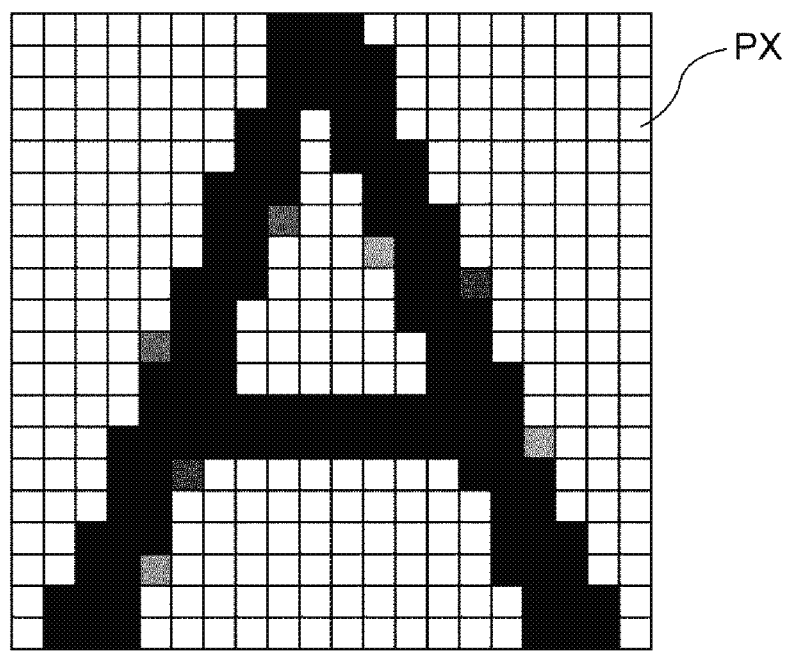
FIG. 8 is a view for illustrating the mark in a captured image.

FIG. 5 is a view for illustrating the viewing field size per one pixel of the capturing element included in the encoder illustrated in FIG. 2. FIG. 6 is a view for illustrating the viewing field size per one pixel in a case where the capturing element is a CCD. FIG. 7 is a view for illustrating the viewing field size per one pixel in a case where the capturing element is a CMOS. FIG. 8 is a view for illustrating the mark in the captured image.

As illustrated in FIG. 5, the mark 21 captured by capturing element 31 is in the capturing region RI which is a viewing field of the capturing element 31. When it is grasped that the capturing region RI is configured of a plurality of pixels PRI disposed in a shape of a matrix in an X1-axis direction and in a Y1-axis direction orthogonal to each other corresponding to a plurality of pixels of the capturing element 31, a length in the X1-axis direction of one pixel PRI is "viewing field size B per one pixel of the capturing element 31". In addition, the X1-axis direction is a direction along the moving direction of the mark 21.

In addition, "center of the mark 21" is particularly referred to as an arbitrary point in a width direction (X1 direction in FIG. 5) at the center in a direction (Y1 direction in FIG. 5) perpendicular to the moving direction of the mark 21. "Viewing field size B per one pixel" is referred to as an amount obtained from (an inverse number of resolution of the capturing element 31)×(an inverse number of optical magnification). Here, "inverse number of resolution of the capturing element 31" is an inverse number of the number of the pixels per unit length in one direction (distance in the X1 direction in FIG. 5) along the capturing surface of the capturing element 31, that is, is referred to as inter-pixel pitch (distance in the X1 direction in FIG. 5) of the capturing element 31. "Optical magnification" is referred to as magnification of a dimension of the mark 21 captured by the capturing element 31 with respect to a practical dimension of the mark 21, and specifically, is referred to as the total magnification (magnification of the lens 32) of the optical system disposed between the mark 21 and the capturing element 31.

In addition, "one pixel" is referred to as the smallest unit for comparing brightness of the template and a capturing region during pattern matching (template matching).

In a case where the capturing element 31 is a CCD, for example, as illustrated in FIG. 6, the capturing element 31 includes a plurality of photodiodes 311 which are disposed in a shape of a matrix, a plurality of vertical transmission paths 312 which are provided for each row of the plurality of photodiodes 311, a horizontal transmission path 313 which is electrically connected to the plurality of vertical transmission paths 312, a gate 314 which is provided between each of the photodiodes 311 and each of the vertical transmission paths 312, and an amplifier 315 which is electrically connected to the horizontal transmission path 313. Here, in a case where the capturing element 31 performs the capturing in one color, a region PX1 for each of the photodiodes 311 configures one pixel PX of the capturing element 31. In addition, in a case where the capturing element 31 performs the capturing in a full color, for example, a region PX2 for each of four photodiodes 311 configured of one for red color, two for green color, and one for blue color configures one pixel PX of the capturing element 31.

In addition, it is possible to similarly define one pixel PX in a case where the capturing element 31 is a CMOS. In other words, in this case, for example, as illustrated in FIG. 7, the capturing element 31 includes the plurality of photodiodes 311 which are disposed in a shape of a matrix, a plurality of vertical signal lines 316 which are provided for each row of the plurality of photodiodes 311, a horizontal signal line 317, an amplifier 318 and a pixel selection switch 319 which are provided between each of the photodiodes 311 and each of the vertical signal lines 316, and a row circuit 320 and a row selection switch 321 which are provided between each of the vertical signal lines 316 and the horizontal signal line 317. Here, in a case where the capturing element 31 performs the capturing in one color, the region PX1 for each of the photodiodes 311 configures one pixel PX of the capturing element 31. In addition, in a case where the capturing element 31 performs the capturing in a full color, for example, the region PX2 for each of four photodiodes 311 configured of one for red color, two for green color, and one for blue color configures one pixel PX of the capturing element 31.

In addition, the disposition and the shape of the photodiode 311 illustrated in FIGS. 6 and 7 are one example, and are not limited thereto. In addition, in a case where the capturing element 31 performs the capturing in a full color, one pixel PX is the minimum range that can indicate color information of a practical image, and for example, may be a region for each of three photodiodes 311 configured of one for red color, one for green color, and one for blue color.

Figure 9:
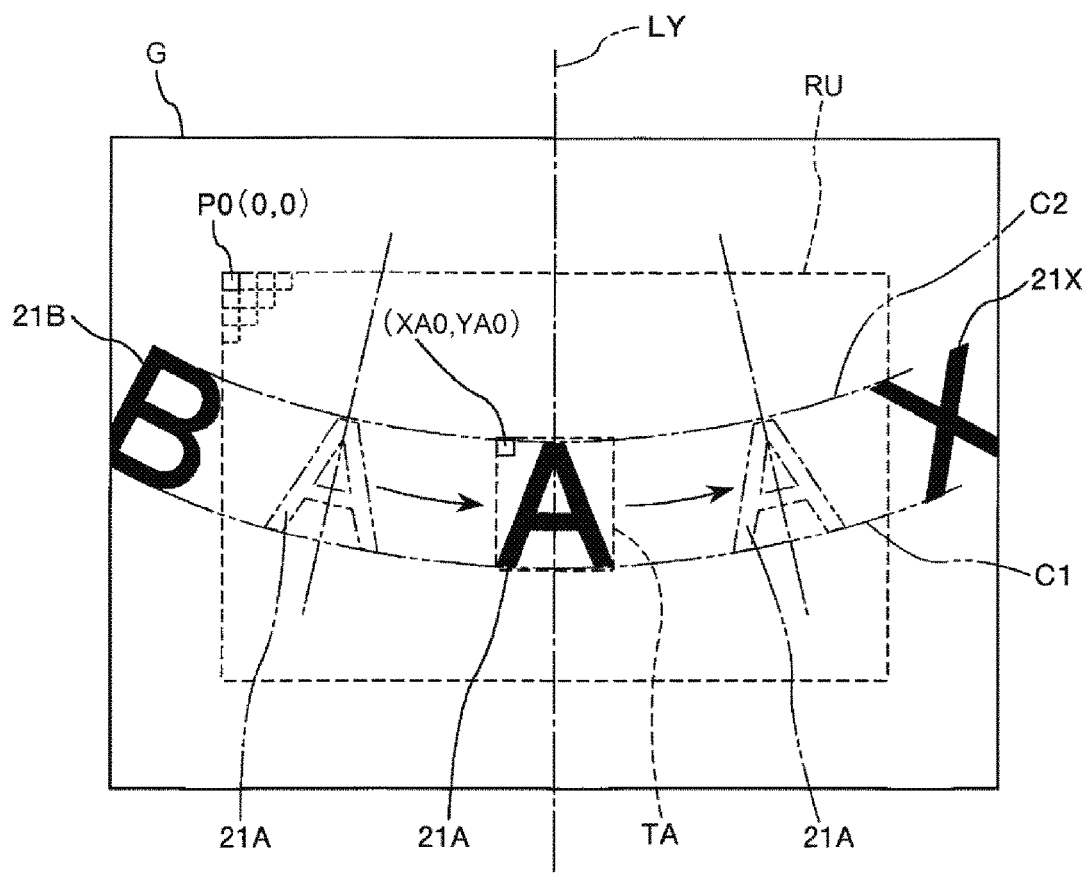
FIG. 9 is a view for illustrating the captured image of the capturing element included in the encoder illustrated in FIG. 2.

For example, as illustrated in FIG. 9, the mark 21 captured by the capturing element 31 is grasped as gradation information for each of the pixels PX of the capturing element 31.

When it is assumed that the repetition positioning accuracy X [m] of the tip end portion CP of the robot arm 100 is determined only by the detection accuracy of the mark 21 by the capturing element 31 of the encoder 1, in a case where the subpixel estimation method is not used, a relational equation (hereinafter, referred to as "relational equation 1") of $2\pi L/X=2\pi R/B$ is satisfied. Therefore, in this case, in order to satisfy the repetition positioning accuracy X, it is necessary to reduce the viewing field size B to be smaller than a value acquired from the relational equation 1. Therefore, for example, in a case where the maximum distance L is set to be approximately 0.6 m and the repetition positioning accuracy X [m] is set to be approximately ±0.00001 m (±10 μm), it is necessary to extremely increase the magnification of the lens 32, or to extremely reduce the pixel size of the capturing element 31, and the lens 32 and the capturing element 31 become expensive.

Meanwhile, in a case of using the subpixel estimation method, it is possible to virtually increase the resolving power of the capturing element 31 to the extent of two times to 100 times. Therefore, in this case, the virtual viewing field size becomes approximately 0.01 times to 0.5 times of the viewing field size B in a case where the subpixel estimation method is not used. When the virtual viewing field size is considered by applying the virtual viewing field in the above-described relational equation 1, a relationship of $2\pi R/0.5B \leq 2\pi L/X \leq 2\pi R/0.01B$ is obtained, and accordingly, as described above, a relationship of $2R/B \leq L/X \leq 100R/B$ is obtained. In addition, the improvement of the resolving power by the subpixel estimation method will be described together with the determination in the rotation state which uses the template matching that will be described later.

Above, by using the subpixel estimation method in the template matching in the determination section 5, it is possible to use the lens 32 and the capturing element 31 which have excellent repetition positioning accuracy X and are relatively inexpensive. The subpixel estimation method used in the template matching in the determination section 5 is not particularly limited, but for example, a correlation method, such as a sum of squared difference (SSD) method, a sum of absolute difference (SAD) method, a zero-mean normalized cross-correlation (ZNCC) method, a phase only correlation (POC) method or the like, is employed.

In addition, in the robot 10, as described above, the inertial sensor 170 provided in the robot arm 100 is included. Accordingly, by controlling the operation of the robot arm 100 based on the detection result (angular velocity, acceleration or the like) of the inertial sensor 170, it is possible to reduce the vibration of the robot arm 100. Therefore, it is possible to perform the positioning of the tip end portion CP of the robot arm 100 with high accuracy and at a high velocity.

In addition, it is also possible to consider the encoder 1A similar to the encoder 1. As described above, the robot 10 includes the robot arm 100 and the encoder 1A. Here, the robot arm 100 includes the first arm 120 and the second arm 130 provided to be rotatable around the second axis J2 (rotation axis) with respect to the first arm 120. In addition, the encoder 1A includes the mark 21 which rotates in accordance with the rotation around the second axis J2 of the second arm 130 with respect to the first arm 120, and the capturing element 31 which captures the mark 21, and detects the rotation state around the second axis J2 of the second arm 130 with respect to the first arm 120 by using the signal output from the capturing element 31.

In particular, in the robot 10, similar to the above-described encoder 1, when the viewing field size per one pixel of the capturing element 31 of the encoder 1A is B [m], the distance between the second axis J2 (rotation axis) and the center of the mark 21 of the encoder 1A is R [m], the maximum distance L11 between the second axis J2 and the tip end portion CP of the robot arm 100 is L [m], and the repetition positioning accuracy of the tip end portion CP of the robot arm 100 is X [m], the relationship of $2R/B \leq L/X \leq 100R/B$ is satisfied.

In this manner, by optimizing the relationship of the viewing field size B, the maximum distance L (L11), the distance R, and the repetition positioning accuracy X, it is possible to select the capturing element 31 and the lens 32 of the encoder 1A having sufficient specification necessary for satisfying the required repetition positioning accuracy X (repetition position accuracy) of the robot arm 100, and as a result, it is possible to achieve low costs of the encoder 1A or low costs of the robot 10.

In addition, since the maximum distance L11 is shorter than the maximum distance L10, the viewing field size B per one pixel of the capturing element 31 used in the encoder 1A can be greater than the viewing field size B per one pixel of the capturing element 31 used in the encoder 1. Therefore, the pixel width of the capturing element 31 used in the encoder 1A can be increased to be greater than the pixel width of the capturing element 31 used in the encoder 1, or the magnification of the lens 32 used in the encoder 1A can be reduced to be smaller than the magnification of the lens 32 used in the encoder 1. In addition, the size (area) of the mark 21 used in the encoder 1A can be smaller than the size (area) of the mark 21 used in the encoder 1.

In addition, "the maximum distance L11 between the second axis J2 and the tip end portion CP of the robot arm 100" is the distance (inter-axis distance between the second axis J2 and the axis J3) between the second axis J2 and the tip end portion CP when viewed from the direction along the second axis J2 (rotation axis).

In this manner, the robot 10 includes the base 110 which is a "member" that supports the first arm 120 to be rotatable around the first axis J1 (first rotation axis), the encoder 1 which is "first encoder" that detects the rotation state of the first arm 120 with respect to the base 110, and the encoder 1A which is "second encoder" that detects the rotation state of the second arm 130 with respect to the first arm 120.

Here, the mark 21 included in the encoder 1 (first encoder) is "first mark" which rotates around the first axis J1 in accordance with the rotation of the first arm 120 with respect to the base 110. In addition, the capturing element 31 included in the encoder 1 is "first capturing element" which captures the mark 21 (first mark). In addition, the mark 21 included in the encoder 1A (second encoder) is "second mark" which rotates around the second axis J2 (second rotation axis). In addition, the capturing element 31 included in the encoder 1A is "second capturing element".

In addition, it is preferable to satisfy at least one of a case where the viewing field size B per one pixel of the capturing element 31 (second capturing element) of the encoder 1A is equal to the viewing field size B per one pixel of the capturing element 31 (first capturing element) of the encoder 1, and a case where the distance R between the second axis J2 and the center of the mark 21 (second mark) of the encoder 1A is equal to the distance R between the first axis J1 and the center of the mark 21 (first mark) of the encoder 1. Accordingly, it is possible to achieve low costs of the encoders 1 and 1A, and to reduce deterioration of a processing velocity. In addition, it is preferable that the resolving power per one rotation of each of the encoder 1 and the encoder 1A is equal to or greater than 14 bits. Accordingly, it is possible to improve tracking accuracy of the robot 10.

Here, a specific value of the viewing field size B, the maximum distance L, the distance R, and the repetition positioning accuracy X of the robot 10 is not particularly limited, but is as follows.

It is preferable that the maximum distance L is, for example, 0.10 m to 0.85 m. In particular, it is preferable that the maximum distance L10 between the first axis J1 and the tip end portion CP of the robot arm 100 is, for example, 0.175 m to 0.85 m. In addition, it is preferable that the maximum distance L11 between the second axis J2 and the tip end portion CP of the robot arm 100 is, for example, 0.1 m to 0.45 m.

In addition, it is preferable that the viewing field size B per one pixel of the capturing element 31 of the encoder 1 is, for example, $2 \times 10^{-6}$ m to $1 \times 10^{-5}$ m (1 µm to 10 µm), and it is more preferable that the viewing field size B is $4 \times 10^{-6}$ m to $6 \times 10^{-6}$ m (4 µm to 6 µm).

In addition, it is preferable that the distance R between the first axis J1 (rotation axis) and the center of the mark 21 of the encoder 1 is, for example, 0.02 m to 0.2 m (20 mm to 200 mm), and it is more preferable that the distance R is 0.03 m to 0.1 m (30 mm to 100 mm).

In addition, it is preferable that the repetition positioning accuracy X of the tip end portion CP of the robot arm 100 is, for example, $5 \times 10^{-6}$ m to $4 \times 10^{-3}$ m (5 µm to 40 µm).

Template Matching and Determination of Rotation State which Uses Template Matching Hereinafter, the template matching and the determination of rotation state which uses the template matching in the determination section 5 will be described. In addition, hereinafter, a case of determining the rotation angle as the rotation state will be representatively described. In addition, hereinafter, the encoder 1 will be representatively described, but the encoder 1A is also similar to the encoder 1.

Obtaining of Reference Image

In the encoder 1, before determining the rotation state of the first arm 120 with respect to the base 110 by using the template matching, the reference image used in the template matching is obtained. The obtaining of the reference image may be performed only one time before the first template matching, but after that, may be performed at appropriate time as necessary. In this case, it is possible to update the reference image used in the template matching to the newly obtained reference image.

When obtaining the reference image, the first arm 120 is appropriately rotated around the first axis J1 with respect to the base 110, and the plurality of marks 21 are captured for each of the marks 21 by the capturing element 31. In addition, by trimming each of the obtained captured images, the reference image for each of the marks 21 is generated. The generated reference image is stored in the storage section 6 together with identification information, pixel coordinates information, and angle information in association therewith. Hereinafter, this will be described in detail based on FIG. 6.

FIG. 9 is a view for illustrating the captured image of the capturing element included in the encoder illustrated in FIG. 2.

When the first arm 120 rotates around the first axis J1 with respect to the base 110, for example, as illustrated in FIG. 9, a mark image 21A which is an image of the mark 21 that illustrates a letter "A" projected in a captured image G of the capturing element 31 moves in the captured image G along arcs C1 and C2. Here, the arc C1 is a track in which a lower end in FIG. 9 of the mark image 21A is drawn in accordance with the rotation of the first arm 120 with respect to the base 110, and the arc C2 is a track in which an upper end in FIG. 9 of the mark image 21A is drawn in accordance with the rotation of the first arm 120 with respect to the base 110. In addition, in FIG. 9, in addition to the mark image 21A, a case where a mark image 21B which is an image of the mark 21 that illustrates a letter "B" and a mark image 21X which is an image of the mark 21 that illustrates a letter "X" are projected in the captured image G, is illustrated.

Here, the captured image G obtained by the capturing of the capturing element 31 has a shape which corresponds to the capturing region RI, and has a rectangular shape having two sides that extend along an X-axis direction and two sides that extend along a Y-axis direction. In addition, the two sides which extend along the X-axis direction of the captured image G are disposed to be along the arcs C1 and C2 as much as possible. In addition, the captured image G has a plurality of pixels which are aligned in a shape of a matrix in the X-axis direction and in the Y-axis direction. Here, the position of the pixel is illustrated by a pixel coordinates system (X, Y) illustrated by "X" that indicates the position of the pixel in the X-axis direction and "Y" that indicates the position of the pixel in the Y-axis direction. In addition, a center region excluding an outer circumferential portion of the captured image G is set to be an effective viewing field region RU, the pixel of a left upper end in the drawing of the effective viewing field region RU is set to be an original point pixel (0, 0) of the pixel coordinates system (X, Y).

For example, in a case of generating a reference image TA for detecting the mark 21 which illustrates a letter "A", the first arm 120 is appropriately rotated with respect to the base 110, and the mark image 21A is positioned at a predetermined position (on a center line LY set at the center in the X-axis direction in the drawing) in the effective viewing field region RU. Here, a rotation angle θA0 of the first arm 120 with respect to the base 110 when the mark image 21A is positioned at the predetermined position is obtained before the measurement or the like.

By trimming the captured image G in a rectangular pixel range to be in the smallest range necessary for containing the mark image 21A, the reference image TA (template for detecting the mark 21 which illustrates a letter "A") is obtained. The obtained reference image TA is stored in the storage section 6. At this time, the reference image TA is stored together with identification information related to the type (in the drawing, the letter "A") of the image, angle information related to the above-described rotation angle θA0, and pixel coordinates information related to reference pixel coordinates (XA0, YA0) which are pixel coordinates of the reference pixel (pixel at the left upper end in the drawing) in the pixel range of the reference image TA, in association therewith. In other words, the reference image TA, and the identification information, the angle information, and the pixel coordinate information which correspond thereto are one template set used in the template matching. Determination of Rotation State which Uses Template Matching Next, based on FIGS. 10 to 14, the template matching which uses the reference image TA generated as described above will be described.

Figure 10:
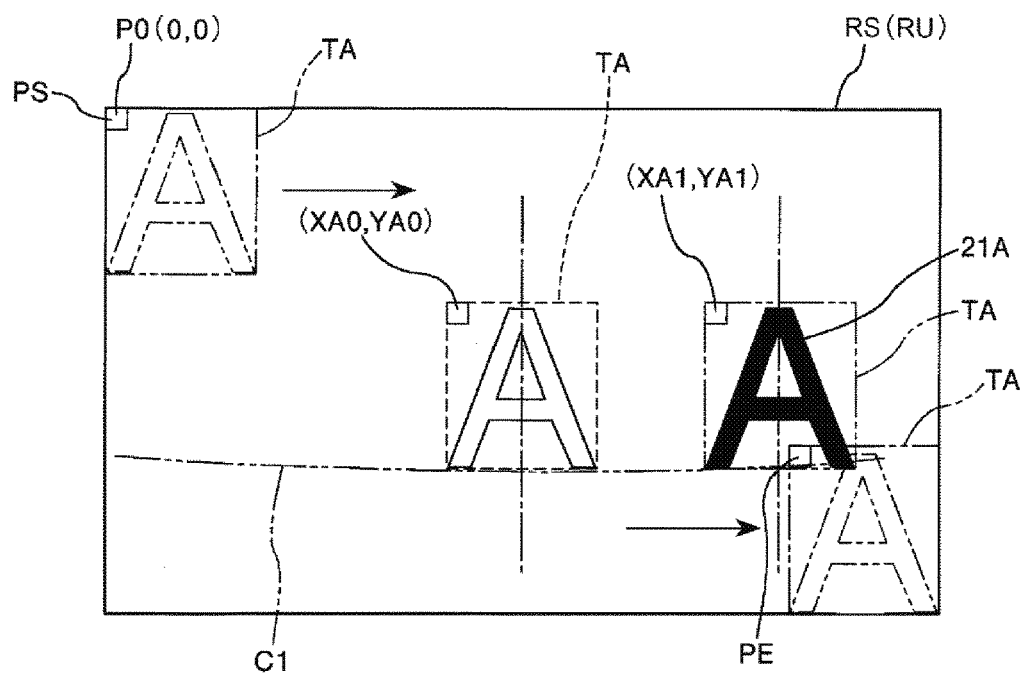
FIG. 10 is a view for illustrating the template matching in a search region set in the captured image illustrated in FIG. 9.
Figure 11:
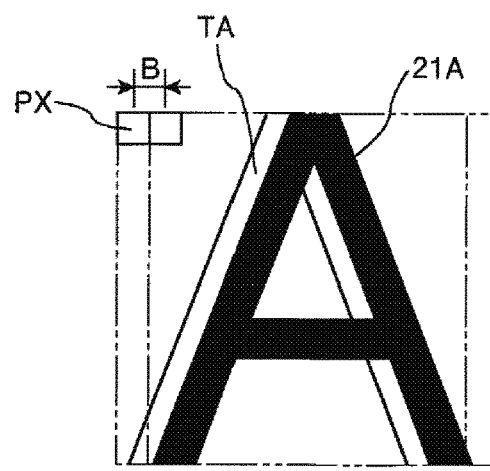
FIG. 11 is a state which is deviated by one pixel from a state where a correlating value is the maximum value or the minimum value during the template matching.
Figure 12:
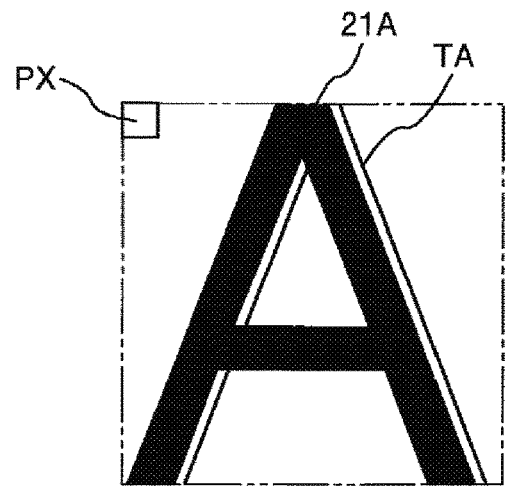
FIG. 12 is a view illustrating a state where the correlating value is the maximum value or the minimum value during the template matching.
Figure 13:
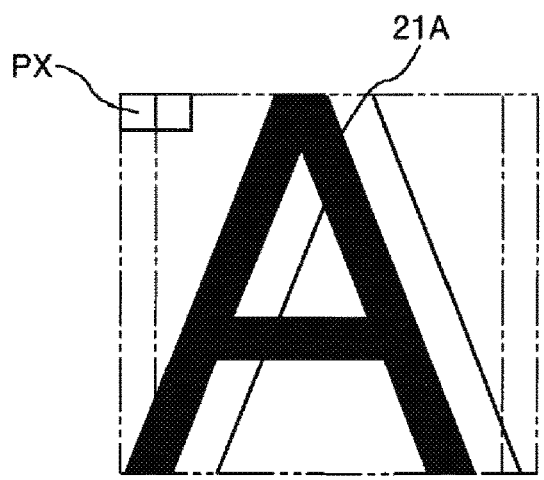
FIG. 13 is a view illustrating a state deviated by one pixel from the state where the correlating value is the maximum value or the minimum value during the template matching, to a side opposite to the state illustrated in FIG. 11.
Figure 14:
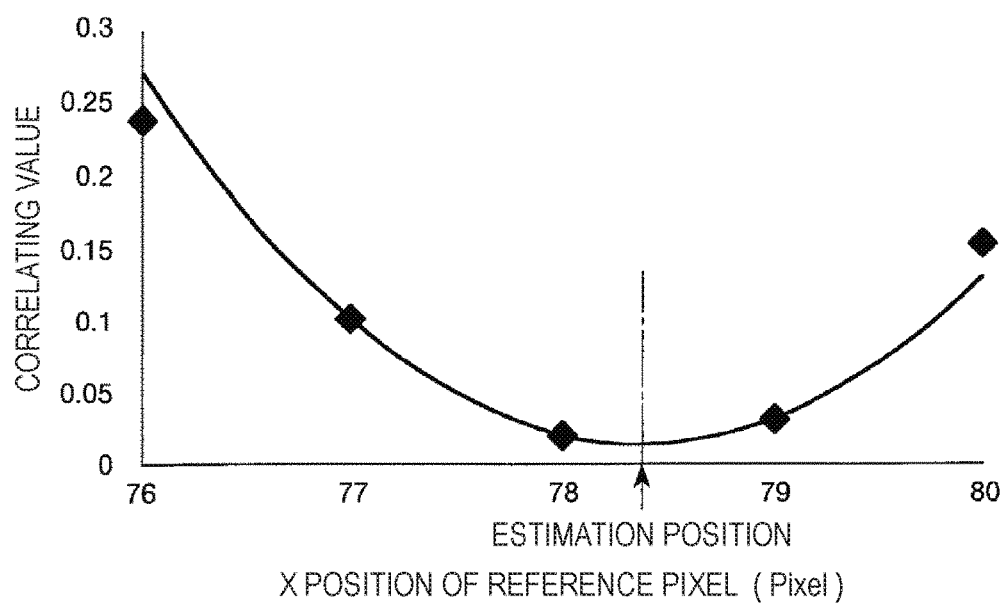
FIG. 14 is a graph illustrating a relationship between an X position (a position in an X1 direction in FIG. 5) of a reference pixel obtained during the template matching, and a correlating value.

FIG. 10 is a view for illustrating the template matching in a search region set in the captured image illustrated in FIG. 9. FIG. 11 is a state deviated by one pixel from the state where a correlating value becomes the maximum value or the minimum value during the template matching. FIG. 12 is a view illustrating a state where the correlating value becomes the maximum value or the minimum value during the template matching. FIG. 13 is a view illustrating a state deviated by one pixel to the side opposite to the state illustrated in FIG. 11 from the state where the correlating value becomes the maximum value or the minimum value during the template matching. FIG. 14 is a graph illustrating a relationship between an X position (a position in the X1 direction in FIG. 5) of the reference pixel obtained during the template matching, and the correlating value.

As illustrated in FIG. 10, when the mark image 21A exists in the effective viewing field region RU, the template matching is performed with respect to the image of the effective viewing field region RU by using the reference image TA. In the embodiment, while the entire effective viewing field region RU is set to be a search region RS, the reference image TA overlaps the search region RS, and the reference image TA is deviated one pixel by one pixel with respect to the search region RS, the correlating value of the part at which the search region RS and the reference image TA overlap each other is calculated. Here, in the reference image TA, the pixel coordinates of the reference pixel are moved one pixel by one pixel to an end pixel PE from a start pixel PS (original point pixel P0), and with respect to the pixels of the entire search region RS, the correlating value (correlating value data) of the part at which the search region RS and the reference image TA overlap each other is calculated for each of the pixel coordinates of the reference pixel of the reference image TA. In addition, the correlating value is stored in the storage section 6 in association with the pixel coordinates of the reference pixel of the reference image TA, as the correlating value data of the captured image data and the reference image data.

Next, among the plurality of correlating values of each of the pixel coordinates stored in the storage section 6, the maximum correlating value is selected, and the pixel coordinates (XA1, YA1) of the reference image TA which becomes the selected correlating value is determined as the pixel coordinates of the mark image 21A. In this manner, it is possible to detect the position of the mark image 21A in the captured image G.

In particular, by using the subpixel estimation method, the pixel coordinates of the mark image 21A is acquired. In the vicinity where the correlating value becomes the maximum value, as illustrated in FIGS. 11 to 12, the reference image TA overlaps the mark 21. In a state illustrated in FIG. 12, the correlating value is greater than that in states illustrated in FIGS. 11 and 13 (states deviated by one pixel from the state illustrated in FIG. 12), and the correlating value becomes the maximum value. However, similar to the state illustrated in FIG. 12, in a case where the reference image TA does not completely match the mark 21, is deviated, and overlaps the mark 21 when it is determined that the state illustrated in FIG. 12 is the pixel position of the mark image 21A, the deviation becomes an error. The deviation becomes the maximum viewing field size B. In other words, in a case where the subpixel estimation method is not used, the viewing field size B becomes the minimum resolving power (accuracy).

Meanwhile, when the subpixel estimation method is used, as illustrated in FIG. 13, by fitting the correlating value of each of the viewing field sizes B by a parabolic line or the like (equal angular straight line may be employed), it is possible to complement (approximate) the inter-correlating values (inter-pixel pitch). Therefore, it is possible to acquire the pixel coordinates of the mark image 21A with higher accuracy. In addition, in the above-described description, a case where the pixel coordinates in which the correlating value becomes the maximum value becomes the pixel position of the mark image 21A is described as an example, but it is also possible to perform the template matching such that the pixel coordinates in which the correlating value becomes the minimum value becomes the pixel position of the mark image 21A. FIG. 13 illustrates a case of performing the template matching such that the pixel coordinates in which the correlating value becomes the minimum value becomes the pixel position of the mark image 21A.

In this manner, the determination section 5 sets the search region RS in the effective viewing field region RU which is a region of a part of the captured image G, and performs the template matching in the search region RS. Accordingly, it is possible to reduce the number of pixels of the search region RS used in the template matching, and to reduce the computing time related to the template matching. Therefore, even in a case where the angular velocity (angular velocity of the mark 21) around the first axis J1 of the first arm 120 is high, it is possible to perform the detection with high accuracy. In addition, even when distortion or blur of an outer circumferential part of the captured image G becomes large due to aberration of the lens 32 disposed between the capturing element 31 and the mark 21, by using the region in which the distortion or blur is small as the search region RS, it is possible to reduce deterioration of the detection accuracy. In addition, the generation of the reference image TA and the template matching may be performed by using the entire captured image G as the search region RS, and in this case, as necessary, it is preferable to perform correction regarding the aberration.

In the embodiment, since the distance between the capturing region RI and the first axis J1 is sufficiently long, in the captured image G, the arcs C1 and C2 can be respectively approximated to a substantially straight line. Therefore, in the captured image G, the moving direction of the mark image 21A can be considered to match the X-axis direction.

Then, the mark image 21A is at a position deviated by the number of pixels (XA1−XA0) in the X-axis direction with respect to the reference image TA which is at the reference pixel coordinates (XA0, YA0). Therefore, when the distance R between the center of the capturing region RI and the first axis J1 is r, and the width (viewing field size B per one pixel of the capturing element 31) of the region on the capturing region RI which corresponds to one pixel of the capturing element 31 is W, a rotation angle θ of the first arm 120 with respect to the base 110 can be acquired by using the following equation (1).

$$\theta = \theta A0 + \frac{(XA1 - XA0) \times W}{2r\pi} \times 360[°] \quad (1)$$

In the Equation (1), (XA1−XA0)×W corresponds to the distance between a practical position which corresponds to the reference pixel coordinates (XA0, YA0) of the reference image TA, and a practical position which corresponds to the pixel coordinates (XA1, YA1) of the reference image TA of which the above-described correlating value is the maximum value. In addition, 2rπ corresponds to the length (length of a circumference) of the track of the mark 21 when the first arm 120 is rotated by 360° with respect to the base 110.

When acquiring the rotation angle θ in this manner, it is also possible to use a method of determining the coordinates of the correlating value which becomes the maximum value by fitting the correlating value of the pixels adjacent to the pixel coordinates (XA1, YA1) by a parabolic line or a parabolic curved surface, which is a so-called subpixel estimation method. Accordingly, it is possible to acquire the position of the mark image 21A in the captured image G by the resolving power finer than the pixel unit, and as a result, it is possible to improve the detection accuracy of the rotation angle θ.

The template matching described above and the calculation of the rotation angle θ which uses the template matching are also similarly performed with respect to other marks 21 (other than the mark 21 which illustrates a letter "A"). Here, at an arbitrary rotation angle θ, at least one mark 21 is not missed and projected in the effective viewing field region RU, and the reference image which corresponds to each of the marks 21 is registered such that the template matching is possible. Accordingly, it is possible to prevent generation of an angle range in which the template matching is not possible.

In FIG. 9 described above, at the arbitrary rotation angle θ, the mark 21 and the effective viewing field region RU are configured such that one mark 21 is not missed and projected in the effective viewing field region RU, but at the arbitrary rotation angle θ, it is preferable that the mark 21 and the effective viewing field region RU are configured such that the plurality of marks 21 are not missed and projected in the effective viewing field region RU. In this case, at the arbitrary rotation angle θ, the template matching is performed by using two or more reference images which correspond to the two or more marks 21 adjacent to each other such that the template matching is possible with respect to the plurality of marks 21 projected in the effective viewing field region RU. At this time, the two or more reference images may partially overlap each other.

In other words, it is preferable that, in the first arm 120, the plurality of marks 21 are disposed, and the capturing element 31 contains all of the two marks 21 adjacent to each other in the circumferential direction around the first axis J1 (rotation axis) and captures the marks 21. Accordingly, even when it is not possible to accurately read one mark 21 of the two marks 21 captured by the capturing element 31 due to contamination or the like, it is possible to read the other mark 21, and to perform the detection. Therefore, there is an advantage that high detection accuracy is likely to be ensured.

Second Embodiment

Figure 15:
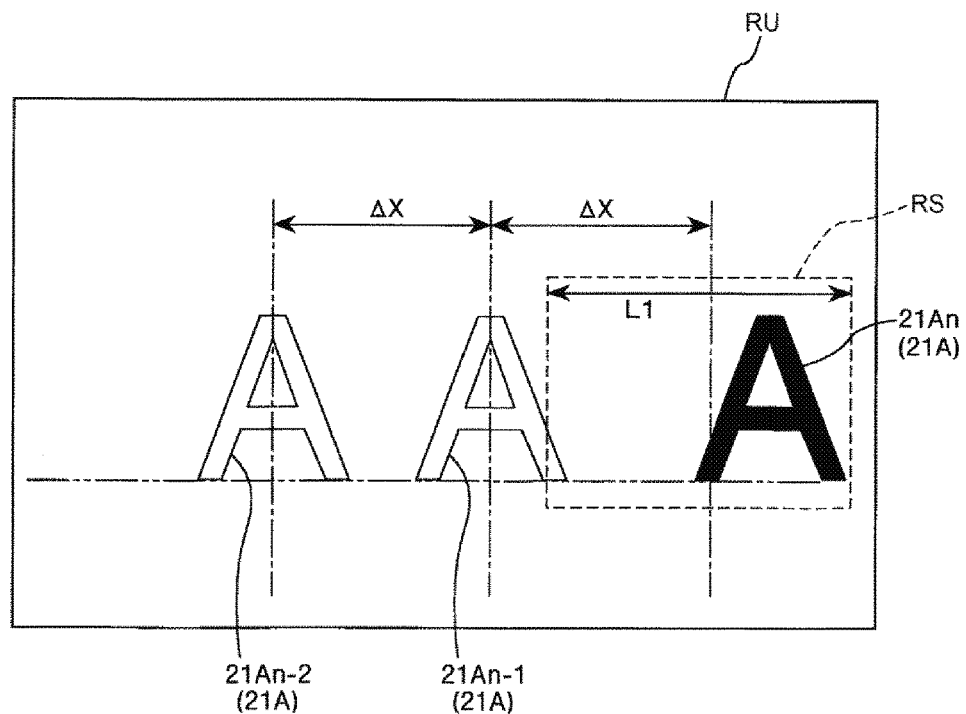
FIG. 15 is a view for illustrating a search region (a region which is set regarding an angular velocity of a mark) in an encoder according to a second embodiment of the invention.
Figure 16:
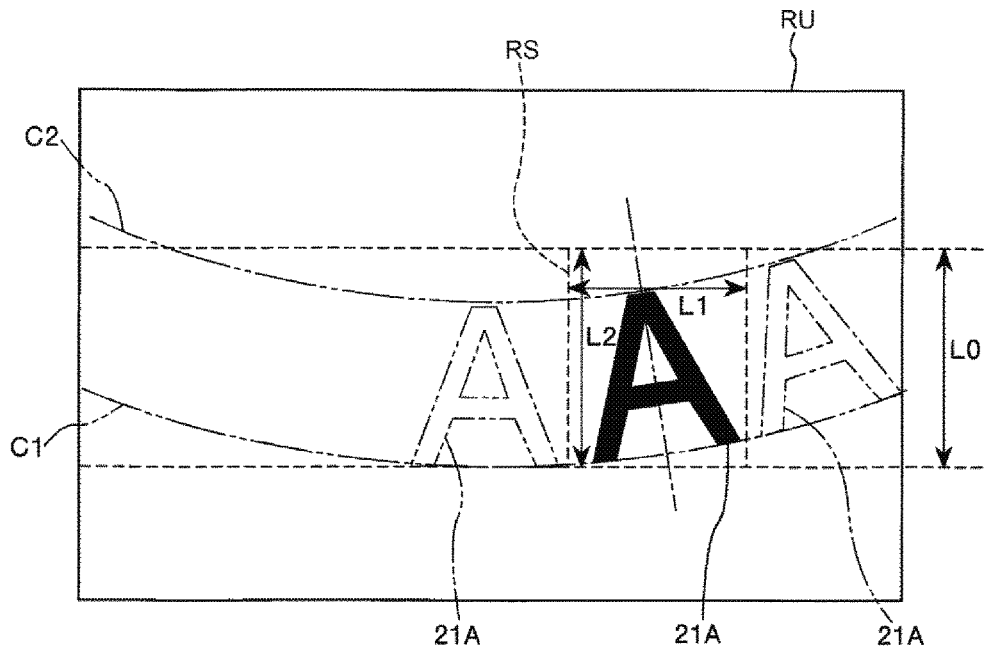
FIG. 16 is a view for illustrating the search region (a region which is set regarding a moving track of the mark) illustrated in FIG. 15.

FIG. 15 is a view for illustrating the search region (a region which is set regarding the angular velocity of the mark) in the encoder according to a second embodiment of the invention. FIG. 16 is a view for illustrating the search region (a region which is set regarding the moving track of the mark) illustrated in FIG. 15.

Hereinafter, the second embodiment will be described, but the points different from the above-described embodiment will be focused in the description, and the description of the similar contents will be omitted.

The embodiment is similar to the above-described first embodiment except that the set range of the search region is different.

In the above-described first embodiment, the entire effective viewing field region RU is set as the search region RS. In other words, in the above-described first embodiment, the correlating value is calculated by performing the template matching with respect to the pixels of the entire effective viewing field region RU. Here, the computing time required for the determination of the rotation angle θ which uses the template matching is proportional to the number of pixels of the search region RS. In addition, the pixel coordinates necessary for acquiring the rotation angle θ is only the pixel coordinates (the pixel coordinates adjacent thereto are also necessary in a case of using the subpixel estimation) in which the correlating value becomes the maximum value. Therefore, in the first embodiment, depending on the case, most of the computing time is consumed in unnecessary computing.

Here, in the embodiment, by using the temporal change of the past rotation angle θ, in the next capturing, the position at which the mark 21 is projected is predicted, and only the pixel region limited to the vicinity of the position is set to be the search region RS. By setting the search region RS in this manner, it is possible to largely reduce the computing amount related to the template matching, and to largely reduce the computing time.

When specifically describing, the determination section 5 makes the information of the determination result related to the rotation angle θ correspond to each of the marks 21, and stores the information in the storage section 6. In addition, the determination section 5 sets (updates) the position and the range of the search region RS by using the information related to the past determination result (rotation angle θ) stored in the storage section 6.

When specifically describing, in a case where the time interval of the capturing timing of the capturing element 31 is constant, when the rotation angle θ determined by the previous capturing of the mark 21 (in the drawing, the mark 21 which illustrates a letter "A") is set to be θ11, the rotation angle θ determined by the capturing of the mark 21 the time before last is set to be θ12, and the predicted rotation angle θ determined by the current capturing of the mark 21 is set to be θ14, if the rotation velocity (angular velocity) of the first arm 120 with respect to the base 110 is constant, θ11, θ12, and θ14 are expressed in the following equation (2).

$$\theta 14 = \theta 11 + (\theta 11 - \theta 12) \quad (2)$$

Here, as illustrated in FIG. 15, the equation (2) means that an inter-center distance between a mark image 21An-1 which is the mark image 21A obtained by the previous capturing and a mark image 21An which is the mark image 21A obtained by the current capturing is equal to an inter-center distance ΔX between a mark image 21An-2 which is the mark image 21A obtained by the capturing the time before last and the mark image 21An-1 which is the mark image 21A obtained by the previous capturing. However, practically, since the rotation velocity (angular velocity) of the first arm 120 is generally variable with respect to the base 110, when the variation amount is set to be Δθ and the practical current rotation angle θ is set to be θ13, the following equation (3) is expressed.

$$\theta 13 = \theta 14 \pm \Delta\theta \quad (3)$$

Here, when the maximum value of Δθ is already known, by setting the maximum value to be Δθ, it is possible to unmistakably determine the range of the θ13. In addition, when θ14 is determined, it is possible to determine a deviation (θ14−θA0) from the rotation angle θA0 which is the angle information of the reference image TA that exists in the effective viewing field region RU. In addition, since the rotation angle θA0 is known, based on the deviation (θ14−θA0), it is possible to predict in which pixel range in the effective viewing field region RU the mark image 21A that is identical to the reference image TA exists.

Since the θ13 has a width of the variation amount Δθ, a pixel range L1 in the X-axis direction of the search region RS is a range obtained by adding the pixel amount that corresponds to the width of at least the variation amount Δθ to the pixel range which corresponds to the reference image TA based on the θ14.

In addition, the pixel range in the Y-axis direction of the search region RS may be the entire region in the Y-axis direction of the effective viewing field region RU similar to the above-described first embodiment, but in a case where the track (arcs C1 and C2) on which the mark image 21A moves in the effective viewing field region RU is seen as a straight line similar to the first embodiment, the pixel range in the Y-axis direction of the search region RS is set to be a pixel range in the Y-axis direction of the reference image TA or a range which is slightly greater than that. In addition, in a case where the arcs C1 and C2 in the effective viewing field region RU are seen as a straight line, as illustrated in FIG. 16, in a pixel range L0 (the maximum range) in the Y-axis direction of the arcs C1 and C2 in the effective viewing field region RU, a pixel range L2 in the Y-axis direction of the search region RS is set.

By setting the search region RS in this manner, even when a positional change in the Y-axis direction of the mark image 21A in the effective viewing field region RU increases, it is possible to set the appropriate search region RS. In addition, by setting the pixel range in the Y-axis direction of the search region RS to be a part in the Y-axis direction of the effective viewing field region RU, it is possible to substantially reduce the computing amount of the template matching. Here, since the template matching may be different from the general template matching for two-dimensionally image searching in a relatively wide range, and the template matching may be one-dimensionally performed mainly in the X-axis direction in the search region RS, the computing amount which is less than a half compare to that of the general template matching may be employed.

From the above, in the embodiment, the determination section 5 can change at least one of the position and the length in the X-axis direction which is "first direction" of the search region RS in the captured image G based on the information related to the angular velocity around the first axis J1 (rotation axis) of the first arm 120 or the mark 21. Accordingly, it is possible to set the efficient search region RS which corresponds to the rotation state (angular velocity) of the first arm 120 or the mark 21, and to further reduce the number of pixels of the search region RS which is used in the template matching.

Here, the determination section 5 calculates the information related to the angular velocity around the first axis J1 of the first arm 120 or the mark 21 with respect to the base 110 (base portion) based on the determination result of two or more past rotation angles θ (rotation state). Accordingly, it is possible to relatively simply set the search region RS which corresponds to the rotation state (angular velocity) of the first arm 120 or the mark 21.

According to the above-described second embodiment, it is also possible to achieve low costs, and to improve detection accuracy.

Third Embodiment

Figure 17:
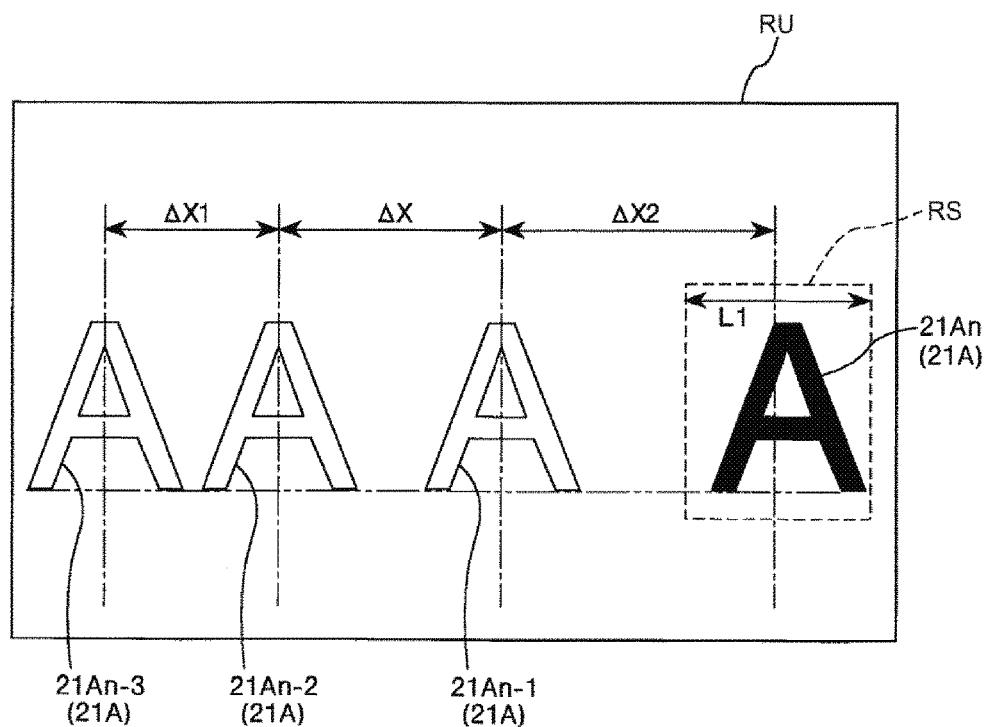
FIG. 17 is a view for illustrating a search region (a region which is set regarding an angular velocity and an angular acceleration of a mark) in an encoder according to a third embodiment of the invention.

FIG. 17 is a view for illustrating the search region (a region which is set regarding the angular velocity and the angular acceleration of the mark) in the encoder according to a third embodiment of the invention.

Hereinafter, the third embodiment will be described, but the points different from the above-described embodiment will be focused in the description, and the description of the similar contents will be omitted.

The embodiment is similar to the above-described first embodiment except that the set range of the search region is different.

In the above-described second embodiment, when setting the search region RS, since only the angular velocity of the immediately previous first arm 120 predicted from the information related to the two past rotation angles θ (θ11 and θ12) is used, it is necessary to set the search region RS having the size regarding the maximum value of the variation amount Δθ of the angular velocity.

In the embodiment, when setting the search region RS, the information related to three or more past rotation angles θ is used. Accordingly, the angular acceleration can also be predicted by a simple calculation in addition to the angular velocity of the first arm 120. When using the angular acceleration, since Δθ of the above-described equation (3) is unmistakably determined, θ13 can also be determined to one value. In addition, since the determined θ13 is a merely predicted value, it is necessary to acquire the practical high-accuracy rotation angle θ by performing the template matching.

For example, as illustrated in FIG. 17, in a case where the inter-center distance ΔX between the mark image 21An-1 which is the mark image 21A obtained by the previous (n−1-th) capturing and the mark image 21An-2 which is the mark image 21A obtained by the capturing (n−2-th) the time before last, is greater than an inter-center distance ΔX1 between the mark image 21An-2 which is the mark image 21A obtained by the capturing (n−2-th) the time before last and a mark image 21An-3 which is the mark image 21A obtained by capturing (n−3-th) three times before, an inter-center distance ΔX2 between the mark image 21An-1 obtained by the previous capturing and the mark image 21An which is the mark image 21A obtained by the current capturing, is greater than the inter-center distance ΔX.

From the above, in the embodiment, the determination section 5 can change at least one of the position and the length in the X-axis direction which is "first direction" of the search region RS in the captured image G based on the information related to the angular acceleration around the first axis J1 (rotation axis) of the first arm 120 or the mark 21. Accordingly, it is possible to set the efficient search region RS which corresponds to the change (angular acceleration) in rotation state (angular velocity) of the first arm 120 or the mark 21.

Here, the determination section 5 calculates the information related to the angular acceleration around the first axis J1 of the first arm 120 or the mark 21 with respect to the base 110 (base portion) based on the determination result of the three or more past rotation angles θ (rotation state). Accordingly, it is possible to relatively simply set the search region RS which corresponds to the change (angular acceleration) in rotation state (angular velocity) of the first arm 120 or the mark 21.

According to the above-described third embodiment, it is possible to achieve low costs, and to improve the detection accuracy.

Fourth Embodiment

Figure 18:
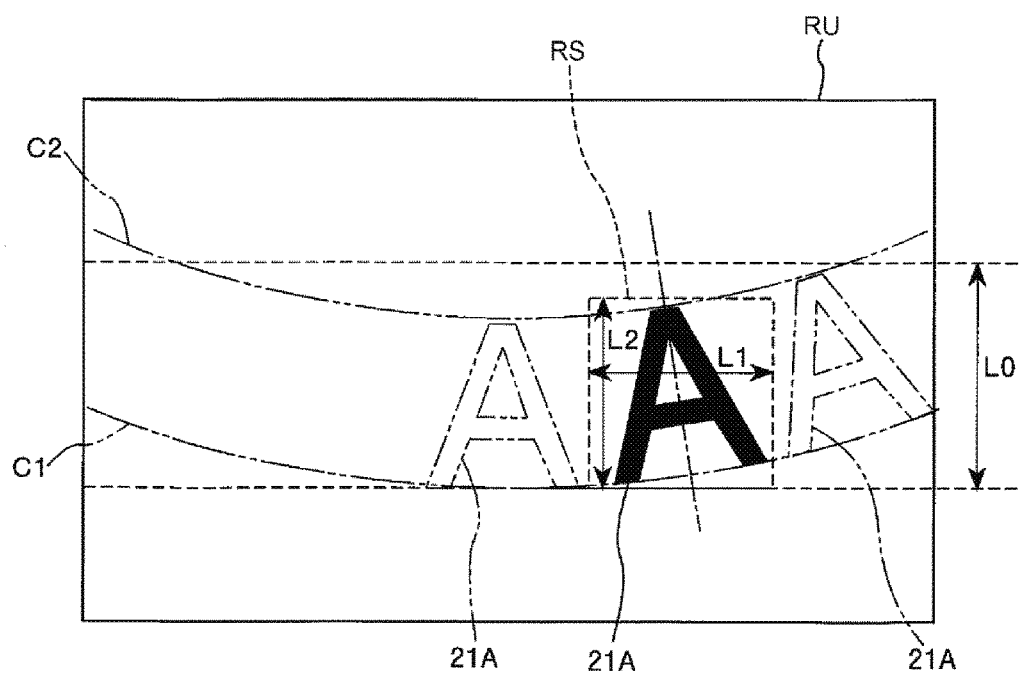
FIG. 18 is a view for illustrating a search region (a region which is set regarding a rotation angle of a mark) in an encoder according to a fourth embodiment of the invention.

FIG. 18 is a view for illustrating the search region (a region which is set regarding the rotation angle of the mark) in the encoder according to a fourth embodiment of the invention.

Hereinafter, the fourth embodiment will be described, but the points different from the above-described embodiment will be focused in the description, and the description of the similar contents will be omitted.

The embodiment is similar to the above-described first embodiment except that the set range of the search region is different.

The above-described arcs C1 and C2 can be acquired by the calculation based on a distance r (or the distance R) between the center of the capturing region RI and the first axis J1, and even when the distance r (or the distance R) is not accurately known, the distance r can be known in advance by performing the capturing by the capturing element 31 while rotating the first arm 120. When the arc C1 or the arc C2 is known in advance, after acquiring the above-described rotation angle θ13, it is possible to set the pixel coordinates which correspond to the rotation angle θ13 on the arcs C1 or C2 to be predicted pixel coordinates (predicted position) of the mark image 21A, and the pixel range which is greater than the pixel size of the reference image TA only by a predetermined range to be the search region RS. In this case, it is possible to set the pixel range L2 in the Y-axis direction of the search region RS to be the minimum limit (for example, to the extent to vertically expand by one pixel with respect to the pixel size of the reference image TA). Accordingly, it is possible to further reduce the number of pixels of the search region RS, and to reduce the computing amount.

From the above, in the embodiment, the determination section 5 can change at least one of the position and the length in the Y-axis direction (second direction) perpendicular to the X-axis direction of the search region RS in the captured image G based on the position in the X-axis (first direction) of the search region RS in the captured image G. Accordingly, it is possible to set the efficient search region RS which corresponds to the rotation state (rotation angle) of the first arm 120 or the mark 21, and to further reduce the number of pixels of the search region RS used in the template matching.

According to the above-described fourth embodiment, it is possible to achieve low costs, and to improve the detection accuracy.

Fifth Embodiment

Figure 19:
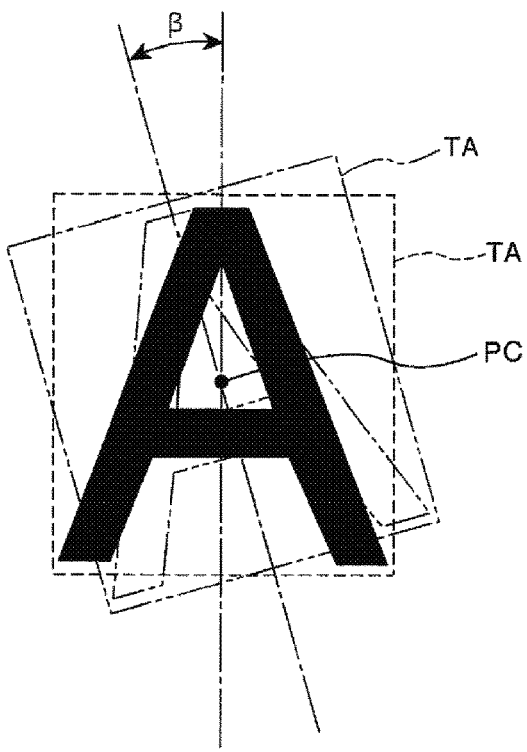
FIG. 19 is a view for illustrating a reference image (template) in a search region in an encoder according to a fifth embodiment of the invention.
Figure 20:
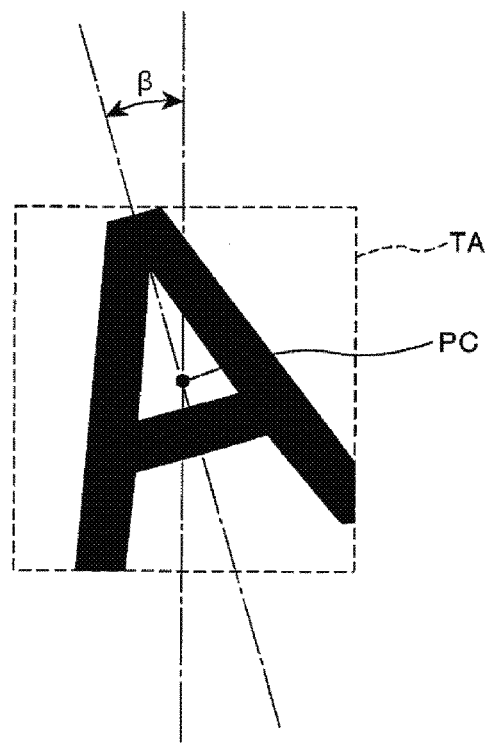
FIG. 20 is a view illustrating a state where a posture of the reference image illustrated in FIG. 19 is changed.

FIG. 19 is a view for illustrating the reference image (template) in the search region in the encoder according to a fifth embodiment of the invention. FIG. 20 is a view illustrating a state where the posture of the reference image illustrated in FIG. 19 is changed.

Hereinafter, the fifth embodiment will be described, but the points different from the above-described embodiment will be focused in the description, and the description of the similar contents will be omitted.

The embodiment is similar to the above-described first to fourth embodiments except that the angle correction is appropriately performed with respect to the reference image in the template matching.

As described above, since the image of the mark 21 in the effective viewing field region RU moves along the arcs C1 and C2, according to the position of the image, the posture of the image is inclined with respect to the X-axis or the Y-axis. In addition, when the inclination of the image of the mark 21 with respect to the reference image TA becomes large, an error of the template matching becomes large (for example, the correlating value becomes small even when the positions match each other), deterioration of the determination accuracy of the rotation angle is caused. As a method for preventing the deterioration of the determination accuracy of the rotation angle, a method for determining the pixel position and the angle at which the correlating value becomes the maximum value, for example, by recalculating the correlating value while slightly changing the posture (angle) of the reference image TA, with respect to several pixel positions at which the correlating value is equal to or greater than the predetermined value, after acquiring the correlating value for each of the pixel positions of the reference image TA while deviating the reference image TA one pixel by one pixel in the search region RS as described above, is considered. However, in the method, the computing amount suddenly increases.

Here, in the embodiment, considering that the inclination of the image of the mark 21 in the effective viewing field region RU changes in accordance with the rotation angle θ, for example, based on the rotation angle θ13 acquired similar to the above-described second embodiment or the third embodiment, the posture of the reference image TA changes (hereinafter, referred to as "inclination correction"). When the rotation angle θ13 is known, the inclination angle to be corrected in the reference image TA is unmistakably determined, and only the computing for performing the inclination correction one time with respect to the reference image TA, may be added. There is a slight increase in computing amount due to the added computing, but it is possible to improve the determination accuracy of the rotation angle θ.

Meanwhile, in the above-described embodiment, a case where the reference pixel of the reference image TA is set to be a left upper end pixel is described, but in a case where the inclination correction of the reference image TA is performed similar to the embodiment, as illustrated in FIG. 19, it is preferable to set the pixel as close as possible to the center PC in the reference image TA to be the reference pixel, and to perform the inclination correction by rotating the reference image TA by an inclination angle β regarding the reference pixel as a reference (center). Accordingly, it is possible to reduce the positional deviation of the reference image TA caused by the inclination correction of the reference image TA. In addition, the correction for enlarging or reducing the reference image TA regarding the center PC as a reference may be performed.

In addition, when performing the inclination correction of the reference image TA, after expanding the pixel range of the reference image TA by adding the pixel having a predetermined width to the outer circumference of the reference image TA, it is preferable to rotate the pixel range by an angle (inclination angle β) that corresponds to the inclination correction, and to trim the pixel range after the rotation by the size of the pixel range of the original reference image TA. Accordingly, as illustrated in FIG. 20, it is possible to reduce generation of pixel failure in the reference image TA after the inclination correction. In addition, even when the pixel failure is generated in the reference image TA, the detection accuracy deteriorates, but it does not mean that the template matching is impossible. In addition, even when the inclination of the reference image TA is not corrected, by correcting the inclination of the search region RS, the increase in calculating amount increases, but it is possible to similarly improve the determination accuracy.

In addition, the inclination correction of the reference image TA may be performed at each of the pixel positions of the reference image TA, but in a case where the inclination of the mark 21 is small, even when the inclination correction of the reference image TA is not performed, there is almost no influence on the determination accuracy of the rotation angle θ. Here, for example, as described above, when θ13 is predicted, it is determined whether or not the predicted θ13 is equal to or less than the predetermined angle, the inclination correction of the reference image TA is performed in a case where the θ13 is greater than the predetermined angle, and meanwhile, the computing time is shortened by omitting the inclination correction of the reference image TA in a case where the θ13 is equal to or less than the predetermined angle.

From the above, in the embodiment, the determination section 5 can change the posture of the reference image TA in the captured image G based on the information related to the rotation angle θ13 (predicted value) of the first arm 120 or the mark 21 with respect to the base 110 (base portion). Accordingly, even in a case where the change in posture of the image of the mark 21 in the search region RS is large, it is possible to reduce the computing amount of the template matching, and to improve accuracy of the template matching.

In addition, the determination section 5 determines whether or not the rotation angle θ13 (predicted value) of the first arm 120 or the mark 21 with respect to the base 110 (base portion) is greater than the set angle, and changes the posture of the reference image TA in the captured image G based on the determination result. Accordingly, it is possible to achieve high accuracy of the template matching, and to further reduce the computing amount of the template matching.

Sixth Embodiment

Figure 21:
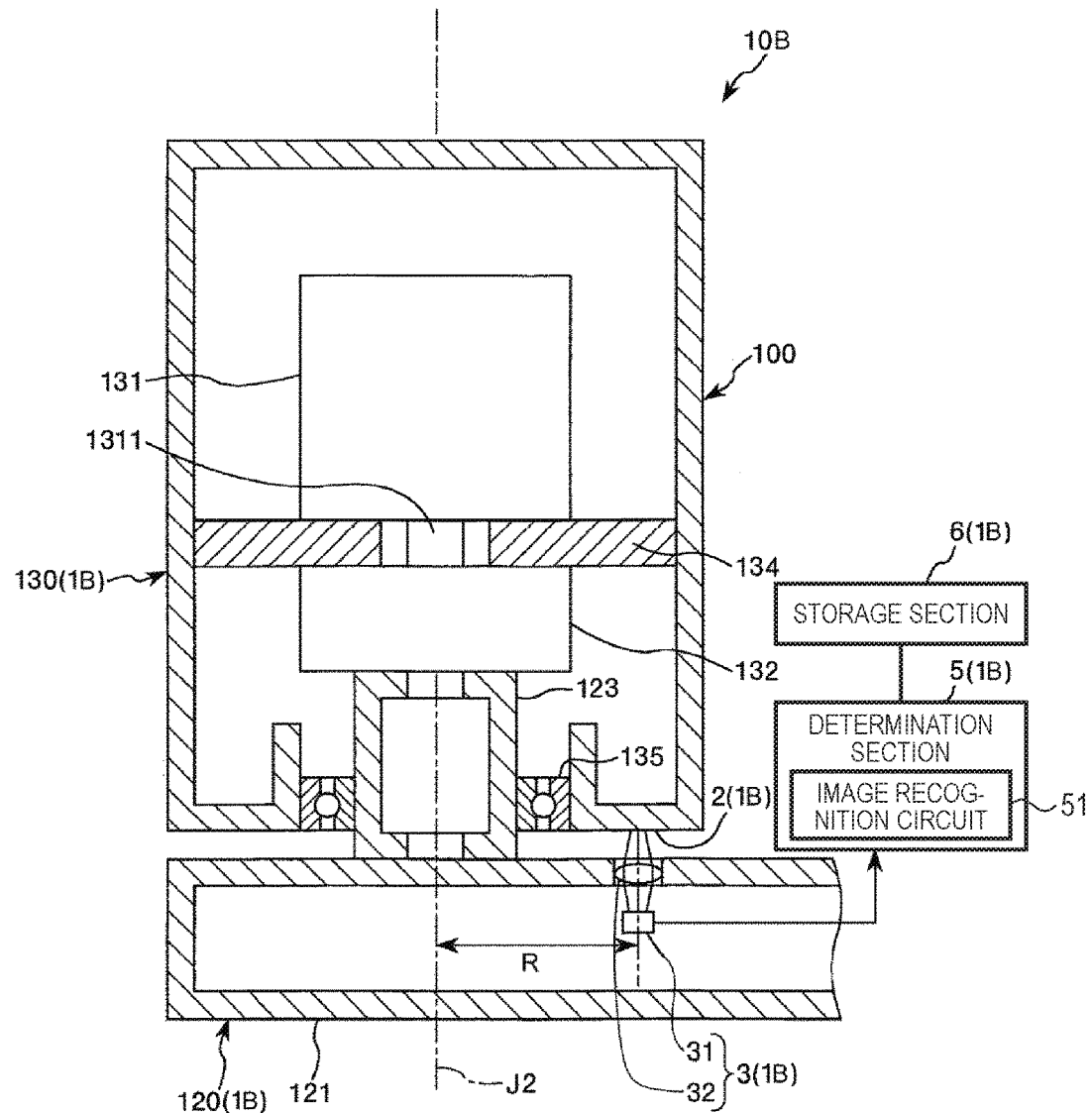
FIG. 21 is a sectional view for illustrating an encoder (second encoder) included in a robot according to a sixth embodiment of the invention.

FIG. 21 is a sectional view for illustrating the encoder (second encoder) included in the robot according to a sixth embodiment of the invention.

Hereinafter, the sixth embodiment will be described, but the points different from the above-described embodiment will be focused in the description, and the description of the similar contents will be omitted.

The embodiment is similar to the above-described first embodiment except that the configuration of the encoder which detects the rotation state of the second arm with respect to the first arm is different.

A robot 10B illustrated in FIG. 21 includes an encoder 1B which detects the rotation state of the second arm 130 with respect to the first arm 120.

In the encoder 1B, basic configuration elements of the encoder 1B are similar to those of the encoder 1A of the above-described first embodiment, but the disposition of the mark portion 2 and the mark detection portion 3 is reverse to that of the encoder 1A. In other words, the encoder 1B includes the mark portion 2 which is provided in the second arm 130, the mark detection portion 3 which is provided in the first arm 120 and detects the mark portion 2, the determination section 5 which determines the relative rotation state of the first arm 120 and the second arm 130 based on the detection result of the mark detection portion 3, and the storage section 6 which is electrically connected to the determination section 5.

The encoder 1B can also be considered similar to the encoder 1A of the first embodiment. Therefore, when the viewing field size per one pixel of the capturing element 31 of the encoder 1B is B [m], the distance between the second axis J2 (rotation axis) and the center of the mark 21 of the encoder 1B is R [m], the maximum distance L11 between the second axis J2 and the tip end portion CP of the robot arm 100 is L [m], and the repetition positioning accuracy of the tip end portion CP of the robot arm 100 is X [m], a relationship of 2R/B≤L/X≤100R/B is satisfied. Accordingly, it is possible to satisfy the required repetition positioning accuracy X (repetition position accuracy) of the robot arm 100, and to achieve low costs of the robot 10B.

In addition, in the embodiment, since the mark detection portion 3 which requires an electric wiring or the like is provided in the first arm 120 on the side closer to the base 110 than the second arm 130, it is not necessary to provide the electric wiring or the like via a joint portion between the first arm 120 and the second arm 130, and compared to case where the mark detection portion 3 is provided in the second arm 130 which is further on the tip end side than the first arm 120, there is also an advantage that the drawing of the electric wiring or the like is simplified.

Seventh Embodiment

Figure 22:
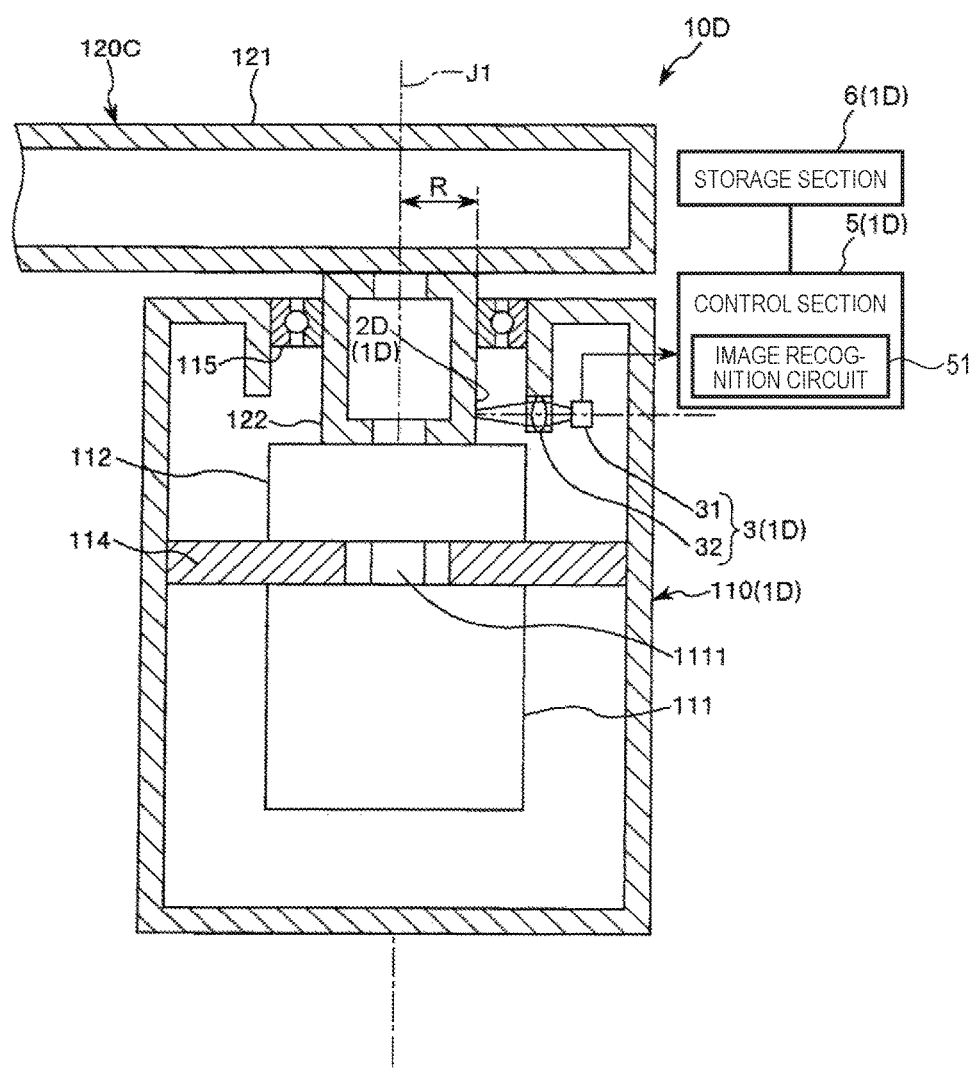
FIG. 22 is a sectional view for illustrating an encoder (first encoder) included in a robot according to a seventh embodiment of the invention.

FIG. 22 is a sectional view for illustrating the encoder (first encoder) included in the robot according to a seventh embodiment of the invention.

Hereinafter, the seventh embodiment will be described, but the points different from the above-described embodiment will be focused in the description, and the description of the similar contents will be omitted.

The embodiment is similar to the above-described first embodiment except that an installation position of the mark included in the encoder and the configuration related thereto are different.

A robot 10D illustrated in FIG. 22 includes an encoder 1D which detects the rotation state of the first arm 120 with respect to the base 110. The encoder 1D includes a mark portion 2D which is provided on a circumferential surface of the axis portion 122 of the first arm 120, the mark detection portion 3 which is provided in the base 110 and detects the mark (not illustrated) included in the mark portion 2D, the determination section 5 which determines the relative rotation state of the base 110 and the first arm 120 based on the detection result of the mark detection portion 3, and the storage section 6 which is electrically connected to the determination section 5.

Although not illustrated, the mark portion 2D includes the plurality of marks which are disposed along the circumferential direction on the outer circumferential surface of the axis portion 122. The plurality of marks can use, for example, the marks similar to the marks 21 of the above-described first embodiment. In other words, on the circumferential surface (cylindrical surface) of the axis portion 122, the plurality of marks that can identify the letters, the numbers, or the symbols are disposed to be aligned along the circumferential direction. In addition, the marks included in the mark portion 2D may be provided directly on the surface of the axis portion 122, or may be provided in a cylindrical member attached to the axis portion 122.

In the embodiment, the capturing element 31 and the lens 32 which are included in the mark detection portion 3 are disposed to be capable of detecting the marks of the mark portion 2D. In other words, the direction in which the marks of the mark portion 2D and the mark detection portion 3 are aligned is a direction intersecting with the first axis J1 (orthogonal direction in the embodiment). Accordingly, it is possible to make the marks of the mark portion 2D and the mark detection portion 3 approach the first axis J1. As a result, it is possible to reduce the size and the weight of the base 110.

In addition, in the encoder 1D, the capturing region of the capturing element 31 is set on the outer circumferential surface of the axis portion 122. In addition, the template matching is performed similar to the above-described first embodiment. At this time, since the marks of the mark portion 2D is provided on the outer circumferential surface of the axis portion 122, the marks linearly move in the capturing region while maintaining a constant posture in accordance with the rotation of the axis portion 122. Therefore, when performing the template matching, it is not necessary to change the orientation of the reference image (template) in accordance with the posture of the mark in the capturing region, the reference image may be moved only in one direction, and thus, there is an advantage that it is possible to reduce the computing amount of the template matching.

However, since the outer circumferential surface of the axis portion 122 is curved, in a case where the lens 32 is generally an expansion optical system, the size of the mark of the mark portion 2D in the capturing region of the capturing element 31 changes in accordance with the position in the capturing region. Therefore, when performing the template matching, from the viewpoint of improving the accuracy, it is preferable to expand or reduce the reference image. In addition, even when the expansion or the reduction of the reference image is not performed, by setting the search region to be a small range in which it is considered that there is no change in size of the mark of the mark portion 2D, or by designing the lens 32 such that the size of the mark of the mark portion 2D in the search region of the capturing element 31 does not change, it is possible to perform high-accuracy template matching.

According to the above-described seventh embodiment, by optimizing the relationship of the viewing field size B, the maximum distance L, the distance R, and the repetition positioning accuracy X, it is also possible to select the capturing element 31 and the lens 32 having sufficient specification necessary for satisfying the required positioning accuracy (repetition positioning accuracy) of the robot arm, and as a result, it is possible to achieve low costs of the encoder 1D, or to achieve low costs of the robot 10D.

Eighth Embodiment

Figure 23:
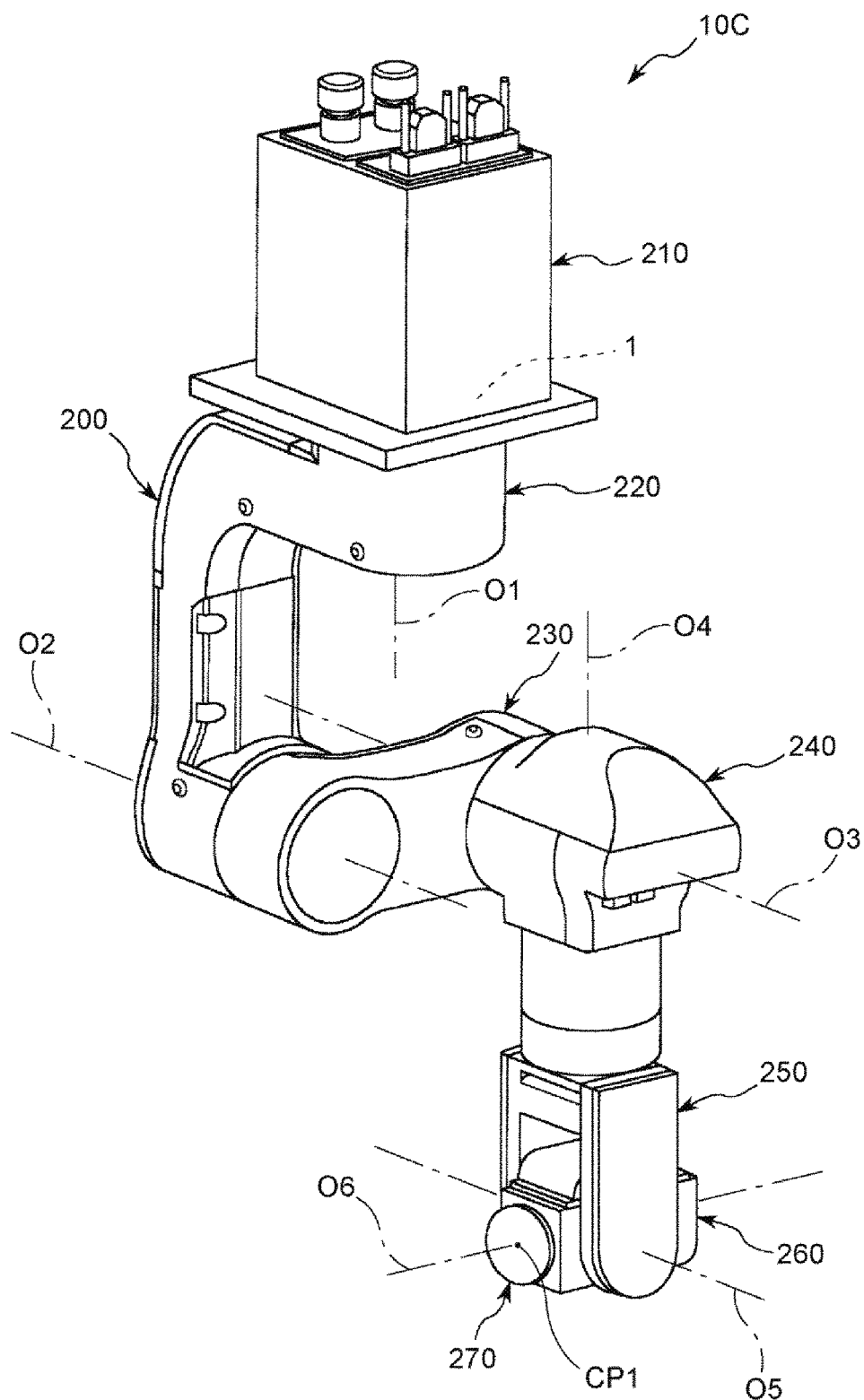
FIG. 23 is a perspective view illustrating a robot according to an eighth embodiment of the invention.
Figure 24:
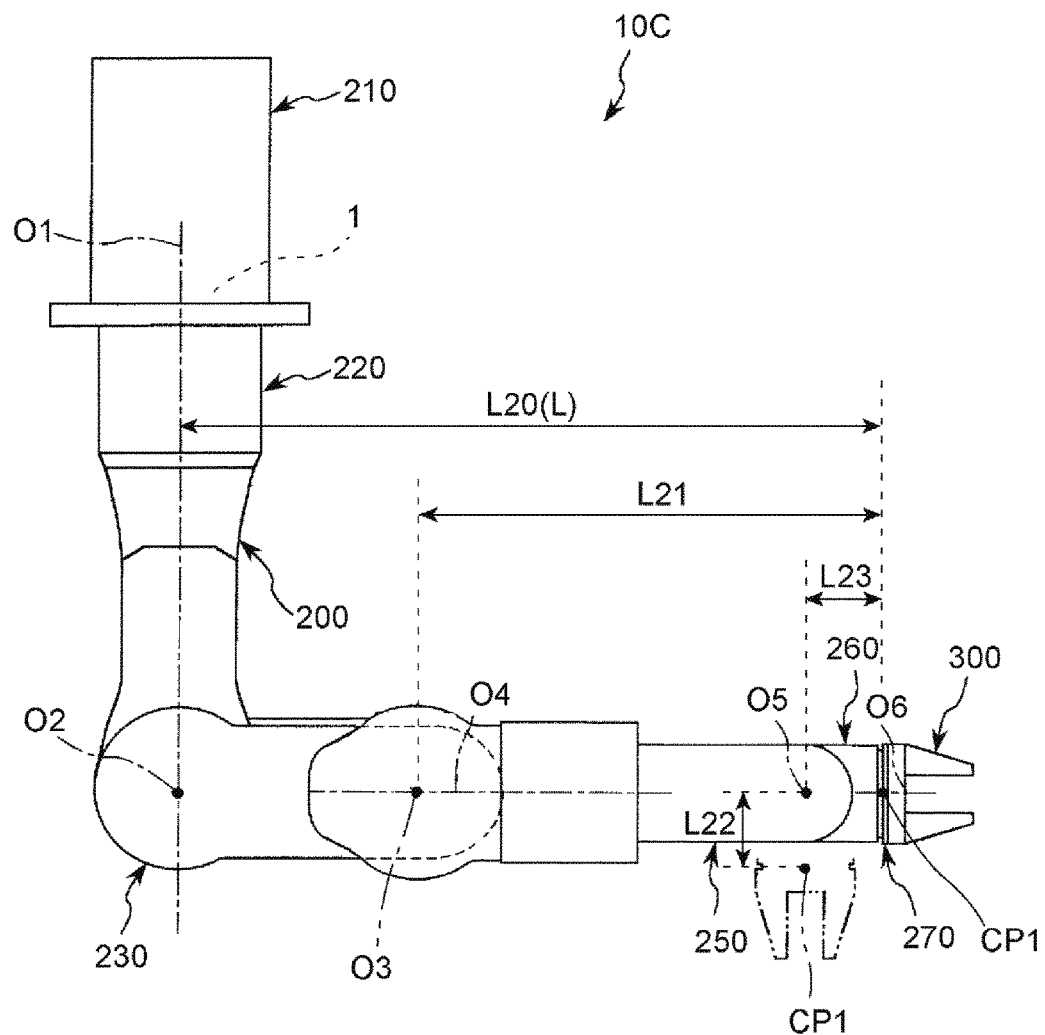
FIG. 24 is a side view illustrating a state where a tip end of a robot arm of the robot illustrated in FIG. 23 is at the farthest position on a side.

FIG. 23 is a perspective view illustrating the robot according to an eighth embodiment of the invention. FIG. 24 is a side view illustrating a state where the tip end of the robot arm of the robot illustrated in FIG. 23 is at the farthest position on the side. In addition, hereinafter, a base 210 side of a robot 10C is referred to as "base end side", and a hand 300 side is referred to as "tip end side".

The robot 10C illustrated in FIG. 23 is a vertical articulated (6 axes) robot. The robot 10C includes the base 210 and a robot arm 200, the robot arm 200 includes a first arm 220, a second arm 230, a third arm 240, a fourth arm 250, a fifth arm 260, and a sixth arm 270, and the arms are linked in this order from the base end side to the tip end side. In the tip end portion of the sixth arm 270, as illustrated in FIG. 24, for example, an end effector, such as the hand 300, which grips precision equipment or components is attached to be attachable and detachable. In addition, although not illustrated, the robot 10C includes a robot control device (control section), such as a personal computer (PC), which controls operations of each portion of the robot 10C.

Here, the base 210 is fixed to, for example, a floor, a wall, or a ceiling. The first arm 220 is rotatable around a first rotation axis O1 with respect to the base 210. The second arm 230 is rotatable around a second rotation axis O2 orthogonal to the first rotation axis O1 with respect to the first arm 220. The third arm 240 is rotatable around a third rotation axis O3 parallel to the second rotation axis O2 with respect to the second arm 230. The fourth arm 250 is rotatable around a fourth rotation axis O4 orthogonal to the third rotation axis O3 with respect to the third arm 240. The fifth arm 260 is rotatable around a fifth rotation axis O5 orthogonal to the fourth rotation axis O4 with respect to the fourth arm 250. The sixth arm 270 is rotatable around a sixth rotation axis O6 orthogonal to the fifth rotation axis O5 with respect to the fifth arm 260. In addition, regarding the first rotation axis O1 to the sixth rotation axis O6, "orthogonal" also includes a case where the angle made by two axes is deviated within a range of 90° to ±5°, and "parallel" also includes a case where one of the two axes is inclined within a range of ±5° with respect to the other one.

In addition, although not illustrated, in each of the linking portions (joints) of the base 210 and the first arm 220 to the sixth arm 270, a driving source including a motor and a decelerator is provided. Here, in the driving source which rotates the first arm 220 with respect to the base 210, the encoder 1 is provided. The detection result of the encoder 1 is, for example, input into the robot control device which is not illustrated, and is used in driving and controlling the driving source that rotates the first arm 220 with respect to the base 210. In addition, although not illustrated, the encoder is also provided in another joint portion, and as the encoder, the encoder 1 can be used.

The encoder 1 included in the robot 10C can also be considered similar to the encoder 1 of the first embodiment. Therefore, in the robot 10C, when the viewing field size per one pixel of the capturing element 31 of the encoder 1 is B [m], the distance between the first rotation axis O1 (rotation axis) and the center of the mark 21 of the encoder 1 is R [m], the maximum distance L20 between the first rotation axis O1 and a tip end portion CP1 of the robot arm 200 is L [m], and the repetition positioning accuracy of the tip end portion CP1 of the robot arm 200 is X [m], a relationship of $2R/B \leq L/X \leq 100R/B$ is satisfied.

In this manner, by optimizing the relationship of the viewing field size B, the maximum distance L (L20), the distance R, and the repetition positioning accuracy X, it is possible to select the capturing element 31 and the lens 32 of the encoder 1 having sufficient specification necessary for satisfying the required repetition positioning accuracy X (repetition position accuracy) of the robot arm 200, and as a result, it is possible to achieve low costs of the encoder 1 or low costs of the robot 10C.

In addition, in the robot 10C, "the maximum distance L20 between the first rotation axis O1 and the tip end portion CP1 of the robot arm 200" is the distance between the first rotation axis O1 and the tip end portion CP1 in a state where the tip end portion CP1 of the robot arm 200 is the farthest from the first rotation axis O1 when viewed from the direction along the first rotation axis O1 (rotation axis). In addition, the tip end portion CP1 of the robot arm 200 is a P point (intersection point between the fifth rotation axis O5 and the sixth rotation axis) and any of the center (attachment center of the end effector) of the tip end surface of the sixth arm 270 and the center (TCP: tool center point) of the hand 300.

Above, a case where the encoder 1 detects the rotation state of the first arm 220 with respect to the base 210 is described, but similar to a case where the encoder 1 detects the rotation state of the other arm, it is possible to optimize the relationship of the viewing field size B, the maximum distance L, the distance R, and the repetition positioning accuracy X. In addition, in this case, one of the two arms of which the rotation state is detected by the encoder 1 may be "first arm", and the other one may be "second arm".

Here, in a case where the encoder 1 detects the rotation state of the second arm 230 with respect to the first arm 220, the maximum distance between the second rotation axis O2 and the tip end portion CP1 of the robot arm 200, that is, the distance (equal to the maximum distance L20) between the second rotation axis O2 and the tip end portion CP1 in a state where the tip end portion CP1 of the robot arm 200 becomes the farthest from the second rotation axis O2 when viewed from the direction along the second rotation axis O2 (rotation axis), may be "maximum distance L". Here, although not particularly limited, it is preferable that a distance 20 is, for example, 0.175 m to 0.85 m.

In addition, in a case where the encoder 1 detects the rotation state of the third arm 240 with respect to the second arm 230, the maximum distance between the third rotation axis O3 and the tip end portion CP1 of the robot arm 200, that is, a distance L21 between the third rotation axis O3 and the tip end portion CP1 in a state where the tip end portion CP1 of the robot arm 200 becomes the farthest from the third rotation axis O3 when viewed from the direction along the third rotation axis O3 (rotation axis), may be "maximum distance L". Here, although not particularly limited, it is preferable that the distance L21 is, for example, 0.1 m to 0.45 m.

In addition, in a case where the encoder 1 detects the rotation state of the fourth arm 250 with respect to the third arm 240, the maximum distance between the fourth rotation axis O4 and the tip end portion CP1 of the robot arm 200, that is, a distance L22 between the fourth rotation axis O4 and the tip end portion CP1 in a state where the tip end portion CP1 of the robot arm 200 becomes the farthest from the fourth rotation axis O4 when viewed from the direction along the fourth rotation axis O4 (rotation axis), may be "maximum distance L".

In addition, in a case where the encoder 1 detects the rotation state of the fifth arm 260 with respect to the fourth arm 250, the maximum distance between the fifth rotation axis O5 and the tip end portion CP1 of the robot arm 200, that is, a distance L23 between the fifth rotation axis O5 and the tip end portion CP1 in a state where the tip end portion CP1 of the robot arm 200 becomes the farthest from the fifth rotation axis O5 when viewed from the direction along the fifth rotation axis O5 (rotation axis), may be "maximum distance L".

In addition, in a case where the encoder 1 detects the rotation state of the sixth arm 270 with respect to the fifth arm 260, generally, when viewed from the direction along the sixth rotation axis O6 (rotation axis), the tip end portion CP1 of the robot arm 200 is identical to the sixth rotation axis O6, and thus, it is not possible to apply the above-described relational equations, but in a case where the tip end portion CP1 is deviated from the sixth rotation axis O6 (for example, when TCP of the hand 300 is set to be the tip end portion CP, and the TCP is deviated from the sixth rotation axis O6), the distance between the sixth rotation axis O6 and the tip end portion CP1 of the robot arm 200 may be "maximum distance L".

Above, the robot according to the invention is described based on the appropriate embodiments illustrated in the drawing, but the invention is not limited thereto, and configurations of each portion can be replaced to an arbitrary configuration having similar functions. In addition, other arbitrary configurations may be added. In addition, configurations of the above-described two or more embodiments may be combined with each other.

In addition, In the encoder 1 of the above-described first embodiment, the mark detection portion 3 is provided in the base 110, the mark portion 2 is provided in the first arm 120, but the mark portion 2 may be provided in the base 110, and the mark detection portion 3 may be provided in the first arm 120.

In addition, the installation location of the encoder is not limited to the joint portion similar to the above-described embodiment, and the joint portion of two arbitrary arms which relatively rotate may be employed.

In addition, in the above-described embodiment, the number of robot arms is one which is the number in the above-described embodiment, but the number of robot arms is not limited thereto, and for example, may be two or more. In other words, the robot according to the invention may be a robot having a plurality of arms, such as a two-arm robot.

In addition, in the above-described embodiments, the number of arms included in the robot arm is not limited to the number of the above-described embodiments, and for example, may be three to five, or seven or more.

In addition, the robot according to the invention is not limited to a robot which is installed to be fixed to a structure, such as a building, and for example, may be a leg type walking (running) robot having a leg portion.

The entire disclosure of Japanese Patent Application No. 2017-008763, filed Jan. 20, 2017 is expressly incorporated by reference herein.

What is claimed is:

1. A robot comprising:
   a base;
   a robot arm provided to be rotatable around a rotation axis with respect to the base;
   a mark which rotates around the rotation axis in accordance with the rotation of the robot arm;
   a capturing element which captures the mark;
   a storage section which stores a reference image therein; and
   a determination section which determines a rotation state of the robot arm by template matching by a subpixel estimation method by using the reference image with respect to an image captured by the capturing element,
   wherein a relationship of $2R/B \leq L/X \leq 100R/B$ is satisfied when a viewing field size per one pixel of the capturing element is B [m], a distance between the rotation axis and the center of the mark is R [m], the maximum distance between the rotation axis and a tip end portion of the robot arm is L [m], and repetition positioning accuracy of the tip end portion is X [m].

2. The robot according to claim 1,
wherein a plurality of the marks are provided,
wherein the capturing element captures two entire marks adjacent to each other in a circumferential direction around the rotation axis.

3. The robot according to claim 1,
wherein the determination section sets a search region in a region of a part of the captured image, and performs the template matching in the search region.

4. The robot according to claim 3,
wherein the determination section is capable of changing at least one of a position and a length in a first direction of the search region in the captured image based on an angular velocity around the rotation axis in the determination result of the past rotation state of the mark.

5. The robot according to claim 4,
wherein the determination section calculates the angular velocity based on the determination result of the two or more past rotation states.

6. The robot according to claim 3,
wherein the determination section is capable of changing at least one of the position and the length in the first direction of the search region in the captured image based on angular acceleration around the rotation axis in the determination result of the past rotation state of the mark.

7. The robot according to claim 6,
wherein the determination section calculates the angular acceleration based on the determination result of the three or more past rotation states.

8. The robot according to claim 3,
wherein the determination section is capable of changing at least one of a position and a length in a second direction perpendicular to the first direction of the search region in the captured image based on the position in the first direction of the search region in the captured image.

9. The robot according to claim 1,
wherein the determination section is capable of changing a posture of the reference image based on the rotation angle around the rotation axis in the determination result of the past rotation state of the mark.

10. The robot according to claim 9,
wherein the determination section determines whether or not the rotation angle around the rotation axis of the mark is greater than a set angle, and changes a posture of the reference image based on the determination result.

11. The robot according to claim 1, further comprising:
an inertial sensor provided in the robot arm.

12. A robot comprising:
a robot arm including a first arm and a second arm provided to be rotatable around a rotation axis with respect to the first arm;
a mark which rotates around the rotation axis in accordance with the rotation of the second arm;
a capturing element which captures the mark;
a storage section which stores a reference image therein; and
a determination section which determines a rotation state of the second arm with respect to the first arm by template matching by a subpixel estimation method by using the reference image with respect to an image captured by the capturing element,
wherein a relationship of $2R/B \leq L/X \leq 100R/B$ is satisfied when a viewing field size per one pixel of the capturing element is B [m], a distance between the rotation axis and the center of the mark is R [m], a distance between the rotation axis and a tip end portion of the robot arm is L [m], and repetition positioning accuracy of the tip end portion of the robot arm is X [m].

13. The robot according to claim 12, further comprising:
a member which supports the first arm to be rotatable around a first rotation axis;
a first encoder which includes a first mark that rotates around the first rotation axis in accordance with rotation of the first arm with respect to the member, and a first capturing element that captures the first mark, and detects a rotation state of the first arm with respect to the member by using a signal output from the first capturing element; and
a second encoder which includes a second mark which is the mark that rotates around a second rotation axis which is the rotation axis, and a second capturing element which is the capturing element,
wherein at least one of a case where the viewing field size per one pixel of the second capturing element is equal to the viewing field size per one pixel of the first capturing element and a case where the distance between the second rotation axis and the center of the second mark is equal to the distance between the first rotation axis and the center of the first mark, is satisfied, and
wherein resolving power per one rotation of each of the first encoder and the second encoder is equal to or greater than 14 bits.

14. The robot according to claim 12,
wherein a plurality of the marks are provided,
wherein the capturing element captures two entire marks adjacent to each other in a circumferential direction around the rotation axis.

15. The robot according to claim 12,
wherein the determination section sets a search region in a region of a part of the captured image, and performs the template matching in the search region.

16. The robot according to claim 15,
wherein the determination section is capable of changing at least one of a position and a length in a first direction of the search region in the captured image based on an angular velocity around the rotation axis in the determination result of the past rotation state of the mark.

17. The robot according to claim 16,
wherein the determination section calculates the angular velocity based on the determination result of the two or more past rotation states.

18. The robot according to claim 15,
wherein the determination section is capable of changing at least one of the position and the length in the first direction of the search region in the captured image based on angular acceleration around the rotation axis in the determination result of the past rotation state of the mark.

19. The robot according to claim 18,
wherein the determination section calculates the angular acceleration based on the determination result of the three or more past rotation states.

20. The robot according to claim 15,
wherein the determination section is capable of changing at least one of a position and a length in a second direction perpendicular to the first direction of the search region in the captured image based on the position in the first direction of the search region in the captured image.

* * * * *